(12) United States Patent  
Kimura et al.

(10) Patent No.: US 11,429,090 B2  
(45) Date of Patent: Aug. 30, 2022

(54) APPARATUS, METHOD, AND PROGRAM

(71) Applicant: YOKOGAWA ELECTRIC CORPORATION, Tokyo (JP)

(72) Inventors: Yuuri Kimura, Tokyo (JP); Tatenobu Seki, Tokyo (JP); Nobuaki Ema, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 52 days.

(21) Appl. No.: 16/911,427

(22) Filed: Jun. 25, 2020

(65) Prior Publication Data

US 2020/0326694 A1 Oct. 15, 2020

Related U.S. Application Data

(63) Continuation of application No. PCT/JP2018/048445, filed on Dec. 28, 2018.

(30) Foreign Application Priority Data

Dec. 28, 2017 (JP) .............................. JP2017-254867

(51) Int. Cl.
*G06F 30/18* (2020.01)
*G05B 19/418* (2006.01)
(Continued)

(52) U.S. Cl.
CPC ....... *G05B 19/41885* (2013.01); *G06F 30/18* (2020.01); *G05B 2219/35009* (2013.01); *G06F 16/787* (2019.01); *H04L 9/3247* (2013.01)

(58) Field of Classification Search
CPC ........... G05B 2219/35009; G06F 30/20; G06F 30/18; G06F 16/787; B01J 2219/00243; H04L 9/3247
See application file for complete search history.

(56) References Cited

U.S. PATENT DOCUMENTS 7,496,414 B2 * 2/2009 Boe ....................... G05B 13/048  
    703/2  
9,008,807 B2 * 4/2015 Shapiro .................. G05B 13/04  
    700/109  
(Continued)

FOREIGN PATENT DOCUMENTS

EP     1560087 A2     8/2005  
JP     2017138919 A     8/2017

OTHER PUBLICATIONS

International Search Resrport and (ISA/237) Written Opinion of the International Search Authority for International Patent Application No. PCT/JP2018/048445, issued/mailed by the Japan Patent Office dated Apr. 11, 2019.

(Continued)

*Primary Examiner* — Kibrom K Gebresilassie

(57) ABSTRACT

To manage a generation history of a dynamic model for performing a dynamic simulation of a plant to efficiently generate the dynamic model, an apparatus, a method, and a program are provided, the apparatus including a model acquiring unit configured to acquire a first dynamic model, a second dynamic model and a third dynamic model that are models calculating dynamic states of a plant, a first difference extracting unit configured to extract at least one first difference being at least one difference between the first dynamic model and the second dynamic model, and a second difference extracting unit configured to extract at least one second difference being at least one difference between the first dynamic model and the third dynamic model.

15 Claims, 22 Drawing Sheets

(51) Int. Cl.
*G06F 16/787* (2019.01)
*H04L 9/32* (2006.01)

(56) References Cited

U.S. PATENT DOCUMENTS

| | | | | |
|---|---|---|---|---|
| 9,834,732 | B2 * | 12/2017 | Wang | C10G 75/02 |
| 10,520,934 | B2 | 12/2019 | Seki | |
| 10,931,290 | B2 * | 2/2021 | Chillara | H03L 7/1075 |
| 10,997,781 | B1 * | 5/2021 | Kalama | G09B 9/02 |
| 2006/0190105 | A1 | 8/2006 | Hsu | |
| 2007/0299642 | A1 * | 12/2007 | Kondo | G05B 17/02 |
| | | | | 714/E11.207 |
| 2009/0222108 | A1 * | 9/2009 | Lou | G05B 13/04 |
| | | | | 700/32 |
| 2010/0088676 | A1 | 4/2010 | Yuan | |
| 2011/0010138 | A1 | 1/2011 | Cheng | |
| 2011/0224959 | A1 * | 9/2011 | Zhang | G05B 17/02 |
| | | | | 703/2 |
| 2012/0143382 | A1 * | 6/2012 | Lou | F23C 9/003 |
| | | | | 700/286 |
| 2018/0088568 | A1 * | 3/2018 | Seki | G05B 17/02 |
| 2018/0262525 | A1 * | 9/2018 | Yan | H04L 63/1425 |
| 2021/0327295 | A1 * | 10/2021 | Heyd | G09B 9/307 |

OTHER PUBLICATIONS

International Preliminary Report on Patentability for International Application No. PCT/JP2018/048445, issued by the International Bureau of WIPO dated Apr. 1, 2020.
Eclipse Foundation: "EMF Compare User Guide", May 11, 2015 XP055286685, URL:https://web.archive.org/web/20150511024842/http:l/www.eclipse.org/emf/compare/documentation/latest/user/userguide.html.
Sourcegear: "DiffMerge", Nov. 2, 2017XP055638790, URL:http://web.archive.org/web/20171113154732/https://sourcegear.com/diffmerge/.

\* cited by examiner

FIG. 7

| SECOND COLUMN | | THIRD COLUMN | | FIRST COLUMN | |
|---|---|---|---|---|---|
| MCHEMRC | | MCHEMRC | | MCHEMRC | |
| | FTNG03 | | | | FTNG03 |
| | HVFLR | | | | HVFLR |
| | HVNG02 | | | | HVNG02 |
| | TENG07 | | | | TENG07 |
| | c108 | | | | c108 |
| | i302 | | | | i302 |
| | | | PTMR10 | | PTMR10 |
| | | | XVMR01 | | XVMR01 |
| | | | c205 | | c205 |
| | FLR1 | | | | FLR1 |
| | FLR2 | | | | FLR2 |
| | MKR1 | | | | MKR1 |
| | MKR2 | | | | MKR2 |
| | s104 | | | | s104 |
| | s301 | | | | s301 |
| | | | MRA1 | | MRA1 |
| | | | MRA2 | | MRA2 |
| | | | s205 | | s205 |
| | Sig MKR1 → FTNG03 | | | | Sig MKR1 → FTNG03 |
| | Sig MKR2 → FTNG07 | | | | Sig MKR2 → FTNG07 |
| | Sig PRD3 → i302 | | | | Sig PRD3 → i302 |
| | | | Sig MKR2 → FTNG07 | | Sig MKR2 → FTNG07 |

| SECOND COLUMN | | THIRD COLUMN | | FIRST COLUMN | |
|---|---|---|---|---|---|
| MCHEMRC | | MCHEMRC | | MCHEMRC | |
| FTNG03 | | | | FTNG03 | |
| HVFLR | | | | HVFLR | |
| HVNG02 | | | | HVNG02 | |
| TENG07 | | | | TENG07 | |
| c108 | | | | c108 | |
| i302 | | | | i302 | |
| | | PTMR10 | | PTMR10 | |
| | | XVMR01 | | XVMR01 | |
| | | c205 | | c205 | |
| FLR1 | | | | FLR1 | |
| FLR2 | | | | FLR2 | |
| MKR1 | | | | MKR1 | |
| MKR2 | | | | MKR2 | |
| s104 | | | | s104 | |
| s301 | | | | s301 | |
| | | MRA1 | | MRA1 | |
| | | MRA2 | | MRA2 | |
| | | s205 | | s205 | |
| Sig MKR1 → FTNG03 | | | | Sig MKR1 → FTNG03 | |
| Sig MKR2 → FTNG07 | | Sig MKR2 → FTNG07 | | Sig MKR2 → FTNG07 | |
| Sig PRD3 → i302 | | | | Sig PRD3 → i302 | |
| | | | | Sig MKR2 → FTNG07 | |

| TAG NAME | CV1 |
|---|---|
| TYPE | VALVE OBJECT |
| VALVE CHARACTERISTIC | LINEAR |
| SIZE | 100 |
| ... | ... |
| ⋮ | ⋮ |

*FIG.13*

| TAG NAME | CV1 |
|---|---|
| TYPE | BALL VALVE |
| ATTRIBUTE | PIPE CONNECTION DEVICE |
| ... | ... |
| ⋮ | ⋮ |

FIG.14

APPARATUS, METHOD, AND PROGRAM

CROSS REFERENCE TO RELATED APPLICATION

This is a continuation application of International Application No. PCT/JP2018/048445, filed on Dec. 28, 2018, which claims priority to Japanese Patent Application No. 2017-254867, filed on Dec. 28, 2017, the contents of each of which are incorporated herein by reference.

BACKGROUND

1. Technical Field

The present invention relates to an apparatus, a method and a program.

Conventionally, for a plant and the like, a design, a performance evaluation, an operator training and the like have been performed using a plurality of pieces of software before completion of an actual plant. For example, software, such as a static simulator to simulate a steady state and the like of the plant, plant engineering software to create a piping and instrumentation diagram and the like of the plant, and a dynamic simulator and the like to simulate a dynamic behavior and the like of the plant, has been used (see Patent Document 1, for example).
[PTL 1]
Japanese Patent Application Publication No. 2017-138919.

SUMMARY

However, because pieces of software respectively perform, in accordance with respective purposes, inputs of required data, processing on input data, outputs of processing results and the like, there is no compatibility between different pieces of software. For example, when a dynamic simulator performs a simulation based on a processing result of a static simulator, a user has to manually perform model conversion and the like to generate a model that can be operated by the dynamic simulator. Therefore, when a modification, improvement, update and the like of the model used by the dynamic simulator are to be performed, it is difficult to grasp changed portions, and manual labor, determination and the like by an experienced operator, a skilled operator and the like have been required.

In a first aspect of the present invention, an apparatus is provided. The apparatus may include a model acquiring unit configured to acquire a first dynamic model, a second dynamic model and a third dynamic model that are models calculating dynamic states of a plant. The apparatus may include a first difference extracting unit configured to extract at least one first difference being at least one difference between the first dynamic model and the second dynamic model. The apparatus may include a second difference extracting unit configured to extract at least one second difference being at least one difference between the first dynamic model and the third dynamic model.

The summary clause does not necessarily describe all necessary features of the embodiments of the present invention. The present invention may also be a sub-combination of the features described above.

BRIEF DESCRIPTION OF DRAWINGS

FIG. 7 shows a first example of a first difference and a second difference that are output in a table format by the screen output unit 1060 according to the present embodiment.

FIG. 8 shows a second example of a first difference and a second difference that are output in a table format by the screen output unit 1060 according to the present embodiment.

FIG. 13 shows one example of a first model converted by a model converting unit 152 according to the present embodiment.

FIG. 14 shows one example of a second model converted by the model converting unit 152 according to the present embodiment.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
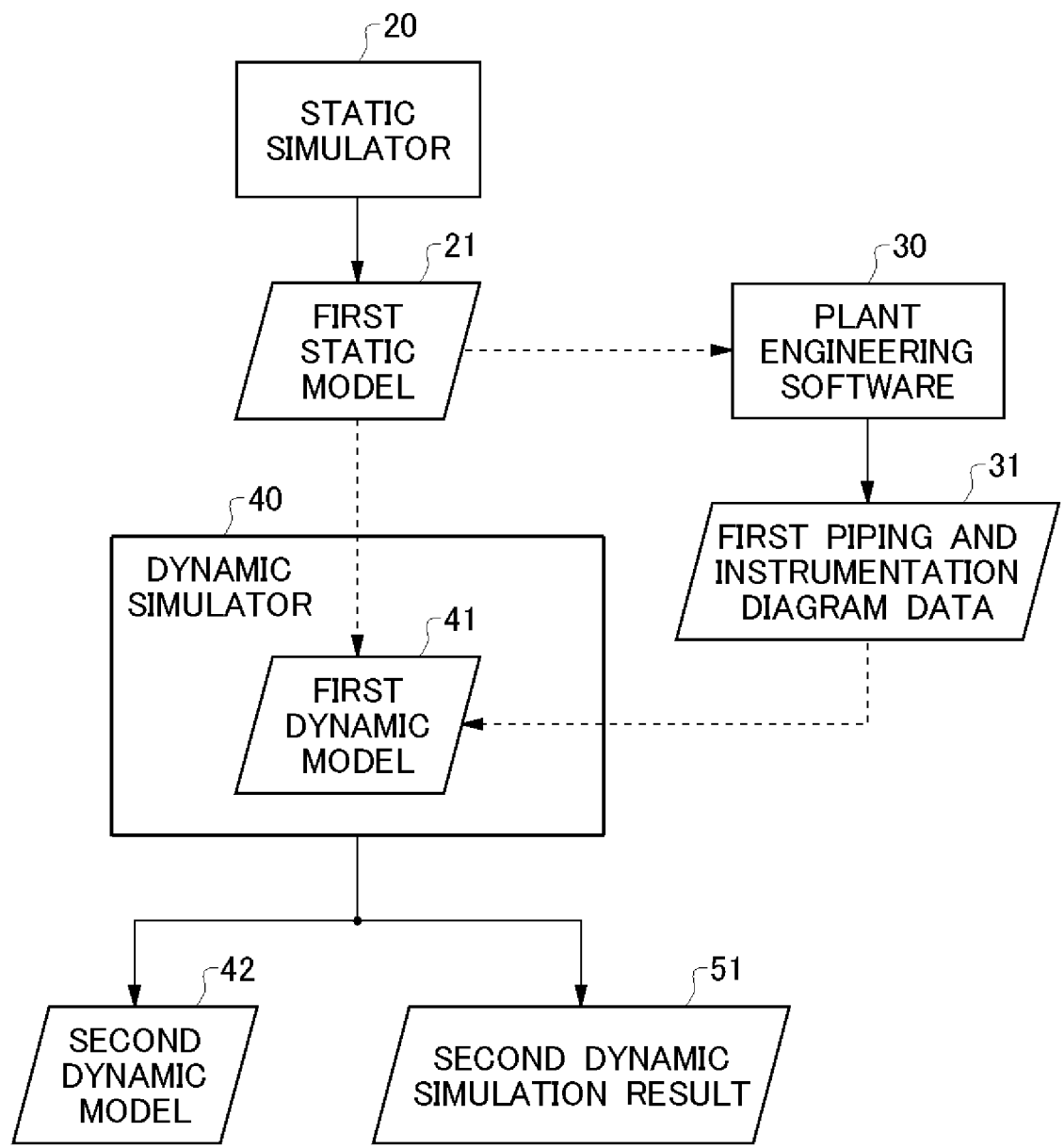
FIG. 1 shows a configuration example of a generating apparatus 10 according to the present embodiment.

FIG. 1 shows a configuration example of a generating apparatus 10 according to the present embodiment. The generating apparatus 10 generates a dynamic model of a plant before completion of the plant to simulate a dynamic behavior and the like. Here, the plant is, for example, at least a part of a factory facility, a mechanical facility, a production facility, a power-generating facility, a storage facility and the like. Here, a first plant is set to as a simulation target. The first plant may serve as at least a part of a production plant, a manufacturing plant, a chemical plant, a sludge treatment plant, a wastewater treatment plant, an air conditioning system, a thermodynamic system and the like. The generating apparatus 10 includes a static simulator 20, plant engineering software 30 and a dynamic simulator 40.

The static simulator 20 simulates a steady state of the first plant. The static simulator 20 calculates a parameter or the like that a device and the like constituting the first plant are to meet in a steady state under an assumed processing condition and the like, and outputs the parameter or the like as a first static model 21. For example, the static simulator 20 generates and outputs the first static model 21 that models ideal inputs and outputs of the first plant that is in a steady operation state. Parameters included in the first static model 21 include physical property information and the like of a raw material, a material, and a product. Note that the physical property information includes information and the like of a storage amount, a flow rate, a temperature, a pressure and environment such as an ambient temperature.

The static simulator 20 may generate the first static model 21 based on outputs, that the first plant is to achieve, such as a product, a supplied substance, management quality and the like. Also, the static simulator 20 may generate the first static model 21 based on a process flow diagram (PFD) and the like. For example, the static simulator 20 represents, by a plurality of parameters, inputs and outputs of each device constituting the first plant, external factors such as an environment, and the like. For example, the static simulator 20 represents the plurality of parameters by simultaneous equations.

As one example, the static simulator 20 sets an input-output difference, such as a material balance of the materials, the product and the like, and a heat balance or the like, to be zero to calculate a value of each parameter in the steady state. The static simulator 20 may calculate a value of each parameter, the value temporally substantially constant. That is, the static simulator 20 may omit a time-depending parameter or the like, or may regard the parameter or the like as a substantially constant value. Also, the static simulator 20 may also calculate each parameter value substantially constant in a predetermined period. Also, the static simulator 20 may also calculate each parameter value at a predetermined time point.

The plant engineering software 30 creates a piping and instrumentation diagram (P & ID) and outputs the same, as first piping and instrumentation diagram data 31. Here, the first piping and instrumentation diagram data 31 is a drawing that respectively represents, with figures such as symbols and items, piping, instrumentation lines, other components and the like of the first plant, for example, and specifically shows, corresponding to a to-be-realized first plant, the symbols and the like by connecting the same according to their functional relations.

The first piping and instrumentation diagram data 31 illustrates names of devices and piping, shapes of valves, a control system, connections between instrumentation devices and the like, and represents ultimate forms of to-be-constructed apparatuses and the like. That is, the first piping and instrumentation diagram data 31 tends to have more information about a number of the devices and a connection between the devices than the information in the first static model 21. Such first piping and instrumentation diagram data 31 is used for a process control of the first plant, a specific design of the piping system and the like. The plant engineering software 30 creates, according to a user operation using the first static model 21 as a reference, the first piping and instrumentation diagram data 31 corresponding to the first static model 21.

The dynamic simulator 40 generates a first dynamic model 41 and performs a dynamic simulation by using the generated first dynamic model 41. The dynamic simulator 40 generates, by an operation of a user using the first piping and instrumentation diagram data 31 as a reference, the first dynamic model 41 that is a model calculating a dynamic state of the first plant based on the first piping and instrumentation diagram data 31. For example, the user picks up, from symbol, items and the like indicated by the first piping and instrumentation diagram data 31, symbols, items and the like that affect a temporal change of the first plant, arranges the picked-up ones so as to correspond to the first static model 21, and generates the first dynamic model 41 by the dynamic simulator 40.

Then, the dynamic simulator 40 performs computations on the first dynamic model 41 represented by differential equations using a plurality of parameters, for example, based on a physical connection relation between the respective devices and an operation condition of each device. The differential equations that represent transient states show, as one example, a non-zero input-output difference in the material balance of the materials, the product and the like, the heat balance or the like, at one time point. Also, the dynamic simulator 40 calculates, by using the created first dynamic model 41, the temporal change of each parameter or the like within a period from when the devices and the like constituting the plant are in a steady state until when they are in the next steady state, for example. That is, the dynamic simulator 40 calculates the temporal change of each parameter or the like by solving the differential equations representing the first dynamic model 41.

The dynamic simulator 40 may determine an initial value of each parameter at a predetermined time point, the operation condition of each device and the like to calculate the temporal change of each parameter. For example, the dynamic simulator 40 may set the initial value of each parameter of the first plant at an operation starting time point, and the operation condition of each device during a process from the start of the operation to the steady state to simulate the temporal change. The simulation result by the dynamic simulator 40 is set as a first dynamic simulation result. Here, the dynamic simulator 40 may adjust the initial value and the like of each parameter based on the first dynamic simulation result so that the operation of the first plant in the steady state corresponds to the first static model 21. That is, the dynamic simulator 40 may adjust the operation condition, the parameters and the like in the first dynamic model 41 to adjust the process leading to the steady state of the first plant.

Also, similarly, the dynamic simulator 40 may perform simulation from the steady state to stop of the operation of the first plant. In addition, the dynamic simulator 40 may also simulate a process in which the plant transits from one steady state to another steady state. In addition, the dynamic simulator 40 may also simulate an abnormality occurrence and the like of the first plant. The dynamic simulator 40 outputs the simulation result obtained by such an adjustment as a second dynamic simulation result 51.

Also, the dynamic simulator 40 may perform the dynamic simulation to output the second dynamic model 42 obtained by adjusting the first dynamic model 41. Such an adjustment is according to a manual work of a user and the like dealing with the dynamic simulator 40. That is, the user indicates, to the dynamic simulator 40, an adjustment and the like including omission, optimization and the like of the model in accordance with a process, a result and the like of the dynamic simulation. In this case, the dynamic simulator 40 outputs the adjusted second dynamic model 42 and the second dynamic simulation result 51 that is a simulation result obtained by using the second dynamic model 42.

As described above, the generating apparatus 10 can generate the second dynamic model 42 and the second dynamic simulation result 51 that can simulate the operation of the first plant to be manufactured. Because a required specification for each device, sizing of the first plant and the like can be determined based on such second dynamic model 42 and second dynamic simulation result 51, the generating apparatus 10 is used for a design and the like of the first plant. Also, a dynamic behavior of the first plant can be checked by the dynamic simulator 40. Also, before the completion of the actual first plant, an operator training can also be performed according to an operation training system and the like.

Here, extension and reconstruction of the plant and the like may be performed. Even in this case, similar to the case of designing the plant, it is necessary to grasp in advance an operation of the plant after the extension and reconstruction by a simulation. Note that a plant obtained by changing the first plant according to the extension and reconstruction is set as a second plant. The generating apparatus 10 described in FIG. 1 can generate a dynamic model and a dynamic simulation result of the second plant by using the first static model 21, the first piping and instrumentation diagram data 31, the second dynamic model 42 and the like that are used for the design of the first plant. An operation of such a generating apparatus 10 is described next.

Figure 2:
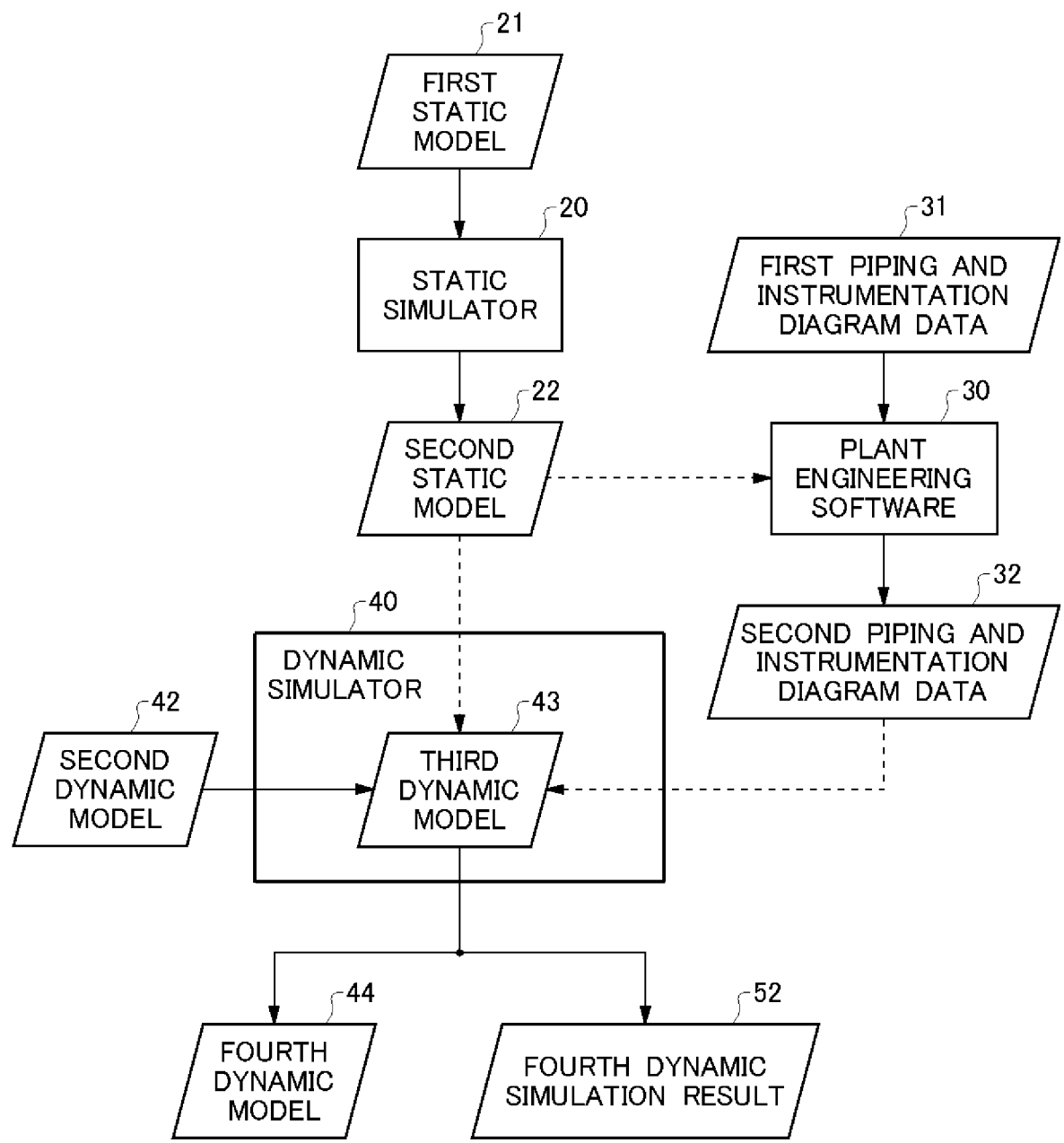
FIG. 2 shows an example in which the generating apparatus 10 according to the present embodiment performs a dynamic simulation of a second plant that is obtained by changing a first plant.

FIG. 2 shows an example in which the generating apparatus 10 according to the present embodiment performs the dynamic simulation of the second plant obtained by changing the first plant. The generating apparatus 10 of a second configuration example generates the dynamic model of the second plant by using data used for the design of the first plant before the extension and reconstruction of the first plant to simulate the dynamic behavior and the like. Note that because the generating apparatus 10 is described by using FIG. 1, the description of the operation of the generating apparatus 10 shown in FIG. 2 similar to that in FIG. 1 is omitted here.

The static simulator 20 simulates a steady state of the second plant. The static simulator 20 outputs the second static model 22 indicating the steady state of the second plant by using the first static model 21 as a reference. The static simulator 20 may modify the first static model 21 in accordance with parts of the second plant that are changed from the first plant. Also, static simulator 20 may generate the second static model 22 by performing the simulation so that the second plant satisfies an assumed processing condition.

The plant engineering software 30 generates second piping and instrumentation diagram data 32 of the second plant. The plant engineering software 30 generates the second piping and instrumentation diagram data 32 according to an operation of a user who uses the first piping and instrumentation diagram data 31 and the second static model 22 as references. The user may generate the second piping and instrumentation diagram data 32 for the second plant by changing the first piping and instrumentation diagram data 31 by using the plant engineering software 30.

The dynamic simulator 40 generates a third dynamic model 43 that is a model calculating a dynamic state of the second plant. The dynamic simulator 40 generates the third dynamic model 43 according to the operation of the user using the second dynamic model 42 and the second piping and instrumentation diagram data 32 as references. The dynamic simulator 40 performs the dynamic simulation by using the third dynamic model 43. The simulation result by the dynamic simulator 40 is set as a third dynamic simulation result. Note that the user may generate and output, by using the dynamic simulator 40, a fourth dynamic model 44 obtained by adjusting the third dynamic model 43. In this case, the dynamic simulator 40 outputs the adjusted fourth dynamic model 44 and a fourth dynamic simulation result 52 that is a simulation result obtained by using the fourth dynamic model 44.

As described above, not only the first plant, the generating apparatus 10 can generate the fourth dynamic model 44 and the fourth dynamic simulation result 52 that can simulate the operation of the second plant that is obtained by changing the first plant. The generating apparatus 10 can generate the fourth dynamic model 44 and the fourth dynamic simulation result 52 by using the data used for the design of the first plant.

However, the static simulator 20, the plant engineering software 30 and the dynamic simulator 40 that are provided in the generating apparatus 10 operate respectively separately and independently. In addition, development, upgrading and the like thereof may also be separately performed. That is, even if the plants to be simulated are the same as or similar to each other, or the used device data and the like have common parts, there may be no compatibility between the respective pieces of software.

Therefore, during a process in which the generating apparatus 10 generates the dynamic model, the user has to manually perform checking, setting, addition, modification, conversion and the like on the parameters, units, items and the like. For example, in FIG. 1 and FIG. 2, the arrows shown by dotted lines indicate parts for which a manual operation of a user is required. Note that in the present embodiment, a device, a unit, an item and the like are collectively called to a "device".

Also, if the plant is changed from the first plant to the second plant, the generating apparatus 10 generates a plurality of dynamic models such as the first dynamic model 41 to the fourth dynamic model 44. Here, portions shown by the dotted lines between the plurality of dynamic models in FIG. 1 and FIG. 2 also include portions manually changed by the user, such as the change from the first dynamic model 41 to the second dynamic model 42 and the change from the third dynamic model 43 to the fourth dynamic model 44. In this way, when the manual changes between the pieces of software, the manual change of the dynamic model and the like are performed, it is difficult to grasp the changed portions of the dynamic model from the changed portions of the static model and the piping and instrumentation diagram data.

Therefore, the user who is acquainted with the operation of the plant and the operation of the dynamic simulator 40 has to perform the dynamic simulation of the second plant while grasping the changed portions of the dynamic model.

That is, working efficiency and man-hour vary depending on a proficiency level of the user, and it may be difficult to smoothly perform the plant design.

Here, the apparatus according to the present embodiment manages change history and the like of the dynamic model and visually and explicitly shows the changed portions to the user, thereby improving the design efficiency of the extension and reconstruction of the plant. Such an apparatus is described next.

Figure 3:
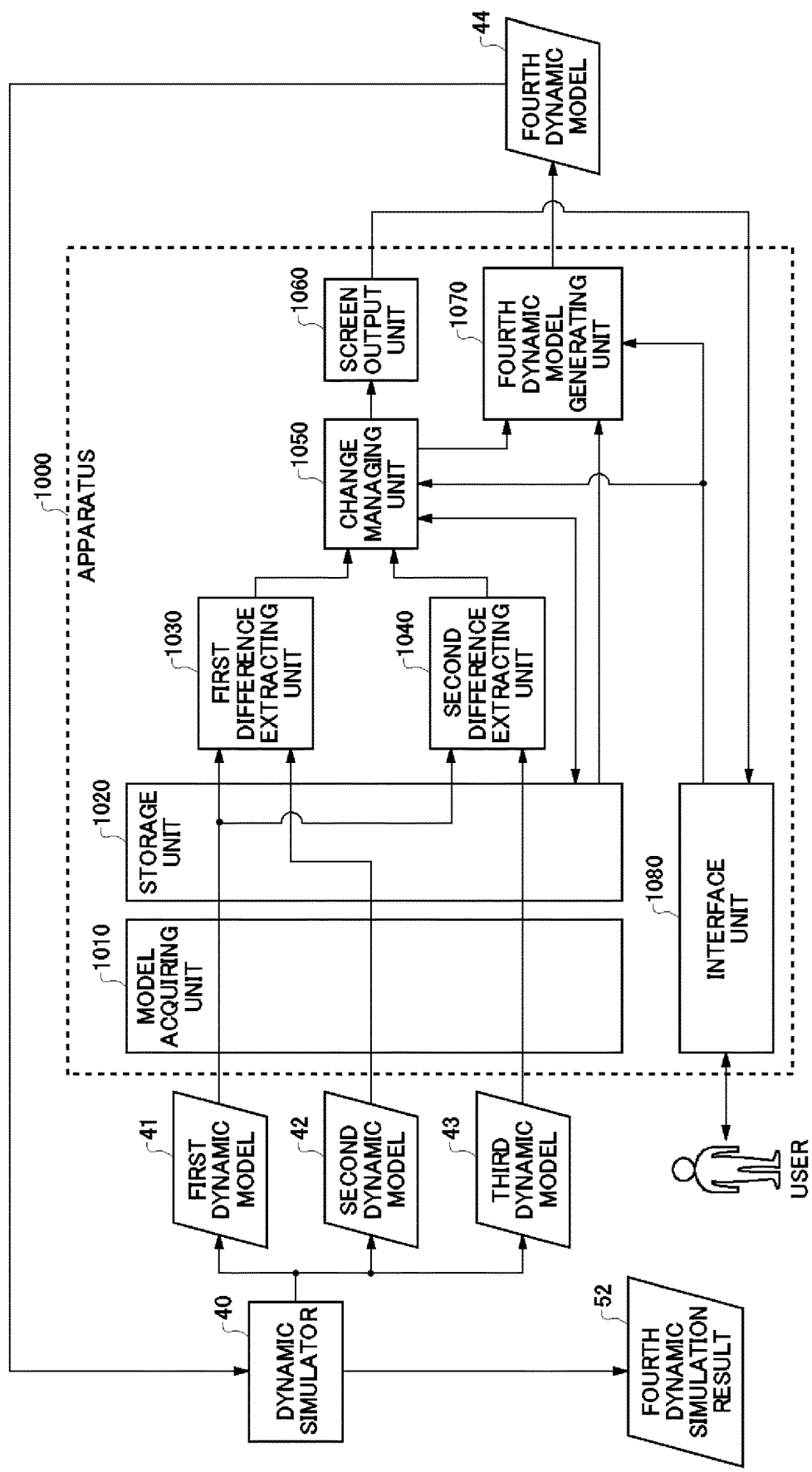
FIG. 3 shows a configuration example of an apparatus 1000 according to the present embodiment.

FIG. 3 shows a configuration example of an apparatus 1000 according to the present embodiment. The apparatus 1000 extracts a difference between a plurality of dynamic models generated during a process of performing the dynamic simulation of the plant and outputs the extracted difference on a screen so as to allow the user to grasp the changed portions of the models. The apparatus 1000 includes a model acquiring unit 1010, a storage unit 1020, a first difference extracting unit 1030, a second difference extracting unit 1040, a change managing unit 1050, a screen output unit 1060, a fourth dynamic model generating unit 1070 and an interface unit 1080.

The model acquiring unit 1010 acquires the dynamic model generated in the process in which the generating apparatus 10 performs the dynamic simulations of the first plant and the second plant. The model acquiring unit 1010 acquires a first dynamic model 41, a second dynamic model 42 and a third dynamic model 43 that are generated by the dynamic simulator 40 and are the models calculating the dynamic states of the plant. Note that in the present embodiment, the first dynamic model 41, the second dynamic model 42 and the third dynamic model 43 are collectively called as the dynamic model.

FIG. 3 illustrates an example in which the first dynamic model 41, the second dynamic model 42 and the third dynamic model 43 are substantially the same models as the first dynamic model 41, the second dynamic model 42 and the third dynamic model 43 described in FIG. 1 and FIG. 2. That is, the first dynamic model 41 is a model calculating the dynamic state of the first plant, and the second dynamic model 42 is a model calculating the dynamic state of the first plant obtained by adjusting the first dynamic model 41. Also, the third dynamic model 43 is a model calculating the dynamic state of the second plant obtained by changing the first plant.

The model acquiring unit 1010 may acquire the generated dynamic model each time when the dynamic simulator 40 generates the dynamic model. Also, if the dynamic simulator 40 has stored the generated dynamic model in a database and the like, the model acquiring unit 1010 may acquire the dynamic model by accessing the database and the like. In this case, the model acquiring unit 1010 may acquire any dynamic model designated by the user among a plurality of dynamic models stored in a database and the like. The model acquiring unit 1010 may acquire the dynamic model via a network and the like.

The storage unit 1020 stores the first dynamic model 41, the second dynamic model 42 and the third dynamic model 43. Also, the storage unit 1020 may also store difference information of the dynamic model generated by the apparatus 1000. Also, the storage unit 1020 may be able to store data on which the apparatus 1000 is to perform processing. The storage unit 1020 may also respectively store data, models, intermediate data, calculation results, parameters and the like calculated (or utilized) in a process in which the apparatus 1000 operates. Also, the storage unit 1020 may supply, in accordance with a request from each unit in the apparatus 1000, the store data to the unit that has made the request. The storage unit 1020 may also temporarily store data as a main storage apparatus or may also store the data for a long period of time as an auxiliary storage apparatus.

The first difference extracting unit 1030 extracts at least one first difference being at least one difference between the first dynamic model 41 and the second dynamic model 42. The first difference extracting unit 1030 may extract a difference of pieces of information of devices, parameters, connections and the like respectively included in the first dynamic model 41 and the second dynamic model 42.

The second difference extracting unit 1040 extracts at least one second difference being at least one difference between the first dynamic model 41 and the third dynamic model 43. The second difference extracting unit 1040 may extract a difference of the pieces of information of the devices, the parameters, the connections and the like respectively included in the first dynamic model 41 and the third dynamic model 43.

The change managing unit 1050 manages information of the first difference and the second difference. For example, the change managing unit 1050 supplies the information of the first difference and the second difference to the screen output unit 1060 to output the information. Also, the change managing unit 1050 may store the information of the first difference and the second difference to the storage unit 1020. Also, if the apparatus 1000 generates the fourth dynamic model 44, the change managing unit 1050 supplies the information of the first difference and the second difference to the fourth dynamic model generating unit 1070. The change managing unit 1050 may supply the information of the first difference and the second difference to each unit in accordance with the indication and the like of the user. In this case, the change managing unit 1050 may read, from the storage unit 1020, the information of the difference in accordance with the indication and the like of the user.

The screen output unit 1060 outputs a display screen that recognizably displays the first difference and the second difference. The screen output unit 1060 may output the display screen on an external or internal monitor and the like. The screen output unit 1060 outputs the display screen to the interface unit 1080, for example. Also, the screen output unit 1060 may output the display screen via a network and the like. The screen output unit 1060 may display a configuration, components, connection forms and the like of the dynamic model. Also, the screen output unit 1060 may display the first difference and the second difference so that the portions changed from the first dynamic model 41 to the second dynamic model 42 and from the first dynamic model 41 to the third dynamic model 43 can be recognized.

The fourth dynamic model generating unit 1070 generates the fourth dynamic model 44. The fourth dynamic model generating unit 1070 may generate the fourth dynamic model 44 in accordance with a designation and the like of the user. For example, the fourth dynamic model generating unit 1070 generates the fourth dynamic model 44 in such a manner that difference information designated by the user among the information of the first difference is incorporated into the fourth dynamic model 44. Similarly, the fourth dynamic model generating unit 1070 generates the fourth dynamic model 44 in such a manner that difference information designated by the user among the information of the second difference is incorporated into the fourth dynamic model 44. The fourth dynamic model generating unit 1070 may generate the fourth dynamic model 44 by incorporating the difference information into at least one of the first dynamic model 41, the second dynamic model 42 and the third dynamic model 43. The fourth dynamic model generating unit 1070 may acquire, from the storage unit 1020, a dynamic model into which the difference information is incorporated.

The interface unit 1080 receives inputs, selection, designation and the like from the user. The interface unit 1080 may supply the inputs, selection, designation and the like received from the user to the change managing unit 1050, the fourth dynamic model generating unit 1070 and the like. Also, the interface unit 1080 may receive the information of the screen that is to be displayed from the screen output unit 1060 and output to the user. The interface unit 1080 may display, to the user, the models, the data, the drawings and the like being in the process in which the apparatus 1000 generates the fourth dynamic model 44.

The interface unit 1080 may have a display screen, an input device and the like that give and receive the information. Also, the interface unit 1080 may also give and receive the information by wired or wireless communications with a device such as a terminal and a mobile terminal that the user uses. Note that the user may include a manufacturer, a designer, an operator, an engineer, a developer, a researcher, a worker, an owner, an administrator and the like of the plant.

As described above, the apparatus 1000 acquires the first dynamic model 41, the second dynamic model 42 and the third dynamic model 43 that are models calculating dynamic states of a plant and extracts the information of the first difference between the first dynamic model 41 and the second dynamic model 42, and the information of the second difference between the first dynamic model 41 and the third dynamic model 43. Therefore, the apparatus 1000 can appropriately select these pieces of difference information to generate the fourth dynamic model 44. Also, by using an arbitrary model as the first dynamic model 41, the second dynamic model 42 and the third dynamic model 43, the apparatus 1000 can generate the fourth dynamic model 44 with the arbitrary model as a base. Also, because the apparatus 1000 can generate the fourth dynamic model 44 as long as the first dynamic model 41, the second dynamic model 42 and the third dynamic model 43 are acquirable, the configuration of the apparatus 1000 can be more simplified compared with a case in which the apparatus 1000 is provided with a historian database for accumulating and storing the dynamic models or a history of the differences.

Also, because the information of the first difference and the second difference are managed by the change managing unit 1050, the apparatus 1000 can appropriately select the difference information to generate the fourth dynamic model 44 by outputting these pieces of information.

Also, because the apparatus 1000 according to the present embodiment recognizably displays the information of the first difference and the second difference, the user and the like can easily grasp the change history of the dynamic model. Also, the apparatus 1000 generates the fourth dynamic model 44 in accordance with the information of the first difference and the second difference, and the designation of the user. Accordingly, the user can rapidly generate the fourth dynamic model 44 only by pointing out the changed portions while grasping the change history of the dynamic model. Also, the dynamic simulator 40 can rapidly perform the dynamic simulation by using the generated fourth dynamic model 44 and can output the fourth dynamic simulation result 52. The operation of such an apparatus 1000 is described next.

Figure 4:
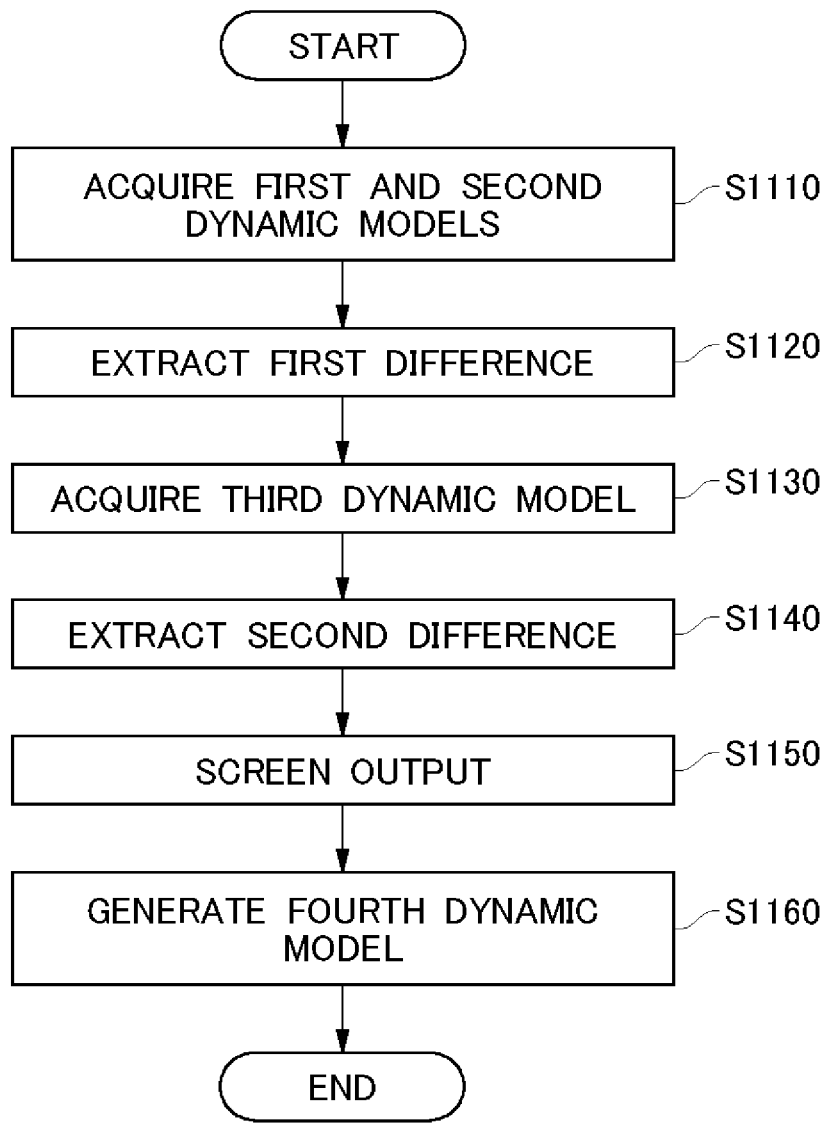
FIG. 4 shows one example of an operation flow of the apparatus 1000 according to the present embodiment.

FIG. 4 shows one example of an operation flow of the apparatus 1000 according to the present embodiment. The apparatus 1000 generates the fourth dynamic model 44 by performing the operation flow shown in FIG. 4 while acquiring the dynamic model generated by the operation of the generating apparatus 10 described in FIG. 1 and FIG. 2.

First, the model acquiring unit 1010 acquires the information of the first dynamic model 41 and the second dynamic model 42 (S1110). The model acquiring unit 1010 may acquire the first dynamic model 41 and the second dynamic model 42 from the dynamic simulator 40 in accordance with the execution, by the generating apparatus 10 as shown in FIG. 1, of the dynamic simulation of the first plant. The model acquiring unit 1010 may store the acquired first dynamic model 41 and second dynamic model 42 in the storage unit 1020. Also, the model acquiring unit 1010 may also supply the acquired first dynamic model 41 and second dynamic model 42 to the first difference extracting unit 1030.

Next, the first difference extracting unit 1030 extracts the first difference based on the information of the first dynamic model 41 and the second dynamic model 42 (S1120). For example, the first difference extracting unit 1030 extracts information of deleted devices, added devices, changed parameters, deleted connections, added connections, changed connections and the like between the first dynamic model 41 and the second dynamic model 42. The change managing unit 1050 may store the first difference extracted by the first difference extracting unit 1030 in the storage unit 1020.

Next, the model acquiring unit 1010 acquires information of the third dynamic model 43 (S1130). The model acquiring unit 1010 may acquire the third dynamic model 43 in a process in which the generating apparatus 10 performs the dynamic simulation of the second plant as shown in FIG. 2. That is, the model acquiring unit 1010 may acquire the third dynamic model 43 from the dynamic simulator 40 in accordance with generation of the third dynamic model 43 by the dynamic simulator 40.

The model acquiring unit 1010 may store the acquired third dynamic model 43 in the storage unit 1020. Also, the model acquiring unit 1010 may also supply the acquired third dynamic model 43 to the second difference extracting unit 1040 along with the first dynamic model 41.

Next, the second difference extracting unit 1040 extracts the second difference based on the information of the first dynamic model 41 and the third dynamic model 43 (S1140). For example, the second difference extracting unit 1040 extracts information of deleted devices, added devices, changed parameters, deleted connections, added connections, changed connections and the like between the first dynamic model 41 and the third dynamic model 43. The change managing unit 1050 may store the second difference extracted by the second difference extracting unit 1040 in the storage unit 1020.

Next, the screen output unit 1060 outputs information of at least parts of the dynamic model on the screen along with the first difference and/or the second difference (S1150). For example, the screen output unit 1060 recognizes the information of the first difference and/or the second difference from the information of the dynamic model in accordance with setting, an indication or the like and outputs the recognized first difference and/or second difference. The screen output unit 1060 may also output the recognized difference by switching, in accordance with the indication, between whether to recognize and output the first difference, or recognize and output the second difference, or recognize and output the first difference and the second difference.

The screen output unit 1060 may output the dynamic model with the drawings in which connection forms between the devices are respectively represented by figures such as symbols and items. Also, the screen output unit 1060 may output the dynamic model in which the connection forms between the devices are represented by a table format. The screen output unit 1060 may recognize and output the first difference and the second difference by using colors, types of lines, fonts, decorations, flashing display, auxiliary lines, indicating lines and the like. The screen output unit 1060 may switch output forms of the first difference and the second difference in accordance with the indication of the user and the like and output the switched one.

Next, the fourth dynamic model generating unit 1070 generates the fourth dynamic model 44 in accordance with the indication of the user and the like (S1160). For example, the fourth dynamic model generating unit 1070 may receive an indication indicating a change to be applied to the dynamic model used for the simulation of the second plant among the change history of the dynamic model shown as the first difference and the second difference. For example, the change managing unit 1050 supplies, in accordance with an indication of the changed contents and reception of the indication of the generation of the fourth dynamic model 44, information of the indication to the fourth dynamic model generating unit 1070. Then, the fourth dynamic model generating unit 1070 generates the fourth dynamic model generating unit 1070 in accordance with the indication.

As described above, the apparatus 1000 according to the present embodiment acquires the plurality of dynamic models generated by the generating apparatus 10 and recognizably outputs the changed portions. Accordingly, for example, the apparatus 1000 can respectively and recognizably display the changed portions of the second dynamic model 42 generated by a manual operation of the user and the changed portions of the third dynamic model 43 manually adjusted by the user. Accordingly, the apparatus 1000 can make the user recognize the adjusted portions and the like of the second dynamic model 42 optimized by the simulation, and can also make the user appropriate determine the adjusted portions to be applied to the dynamic model used for the simulation of the second plant. Also, because the apparatus 1000 generates the fourth dynamic model 44 by adopting the changed portions in accordance with the indication of the user, the apparatus 1000 can rapidly perform the dynamic simulation.

Although an example in which the apparatus 1000 according to the present embodiment acquires the first dynamic model 41, the second dynamic model 42 and the third dynamic model 43 generated by the generating apparatus 10 and extracts the difference between the respective models is described as described above, the apparatus 1000 is not limited to this. The apparatus 1000 may acquire a dynamic model at a time point designated by the user, for example, if the dynamic model is a dynamic model generated by the generating apparatus 10 for a purpose of the plant design, or may also acquire a dynamic model, that is generated in the past, designated by the user. The apparatus 1000 may acquire the designated plurality of dynamic models and extract the difference between the respective models.

Although it is described that the operation of the second plant obtained by the extension and reconstruction of the first plant and the like can be grasped in advance by the simulation according to the apparatus 1000 according to the present embodiment described above, the apparatus 1000 is not limited to this. For example, the apparatus 1000 can also be applied to a case of constructing a duplicate plant, such as a construction of the second plant that is approximately the same as the first plant. That is, the apparatus 1000 may generate the fourth dynamic model 44 to meet the environment of the location of the construction in the second plant being a duplicate plant while using the first dynamic model 41 and the second dynamic model 42 of the first plant that is an original plant as the references. Note that in this case, the first dynamic model 41 and the third dynamic model 43 may be approximately equal to each other.

Figure 5:
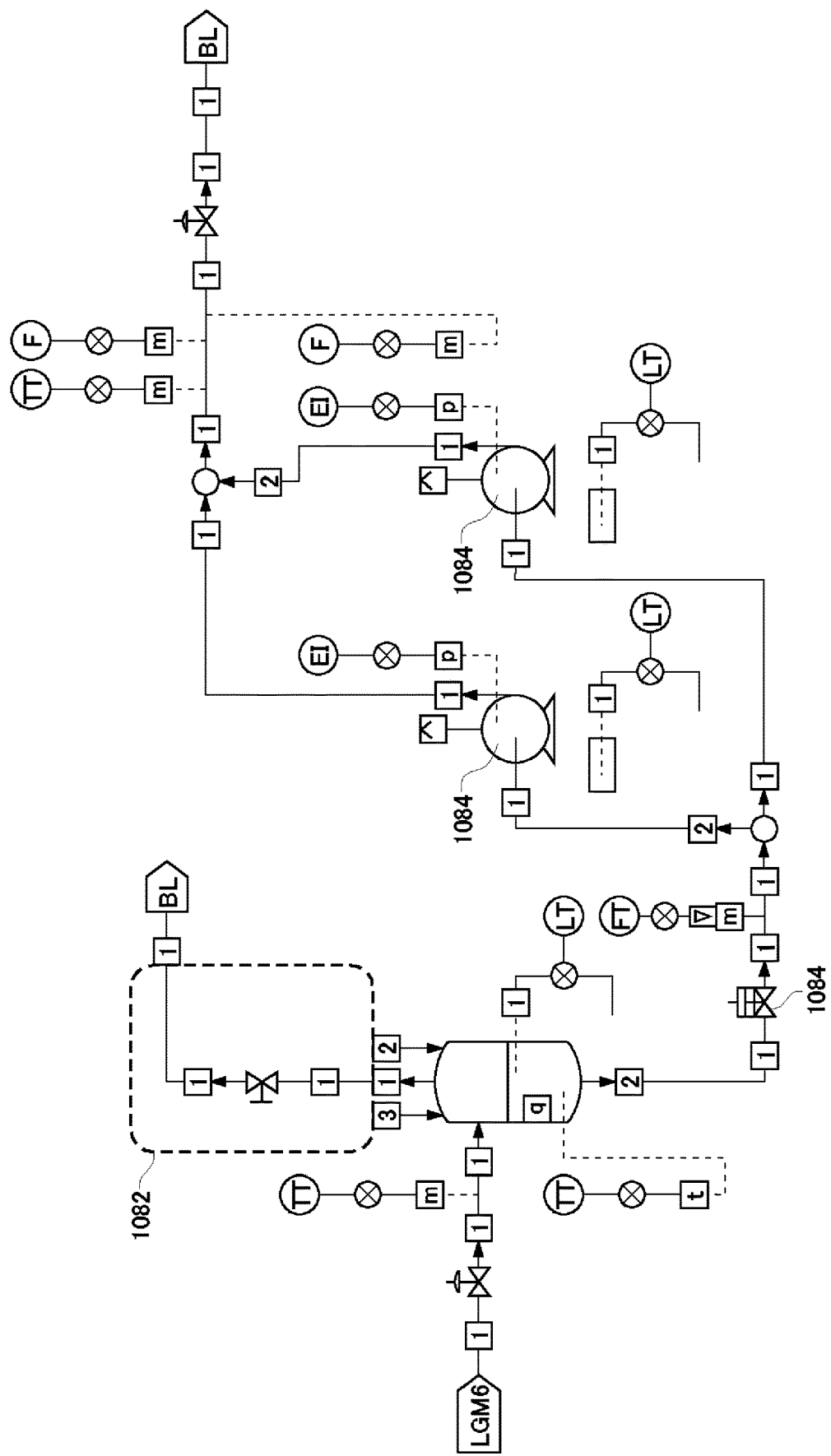
FIG. 5 shows one example of a second dynamic model 42 that is output by a screen output unit 1060 according to the present embodiment.

Examples of the output screen of the screen output unit 1060 according to the present embodiment described above are shown in FIG. 5 to FIG. 8. FIG. 5 shows one example of the second dynamic model 42 that is output by the screen output unit 1060 according to the present embodiment. FIG. 5 shows an example in which the second dynamic model 42 is represented with figures such as symbols and items. The screen output unit 1060 recognizably displays the first difference of the second dynamic model 42. For example, the second dynamic model 42 has a first portion 1082 and a second portion 1084 as the first difference, and the screen output unit 1060 displays the first portion 1082 and the second portion 1084 with a different color from that of portions that are not changed from the first dynamic model 41.

As one example, the first portion 1082 is a device added by the adjustment from the first dynamic model 41 to the second dynamic model 42. Also, the second portion 1084 is a device whose parameter is changed by the adjustment. FIG. 5 shows an example in which there are one added device and three devices whose parameters are changed. The screen output unit 1060 may respectively display, in different colors, the portions having types of change that are different from each other in this way. For example, the screen output unit 1060 displays the first portion 1082 in green color and displays the second portion 1084 in yellow color.

Figure 6:
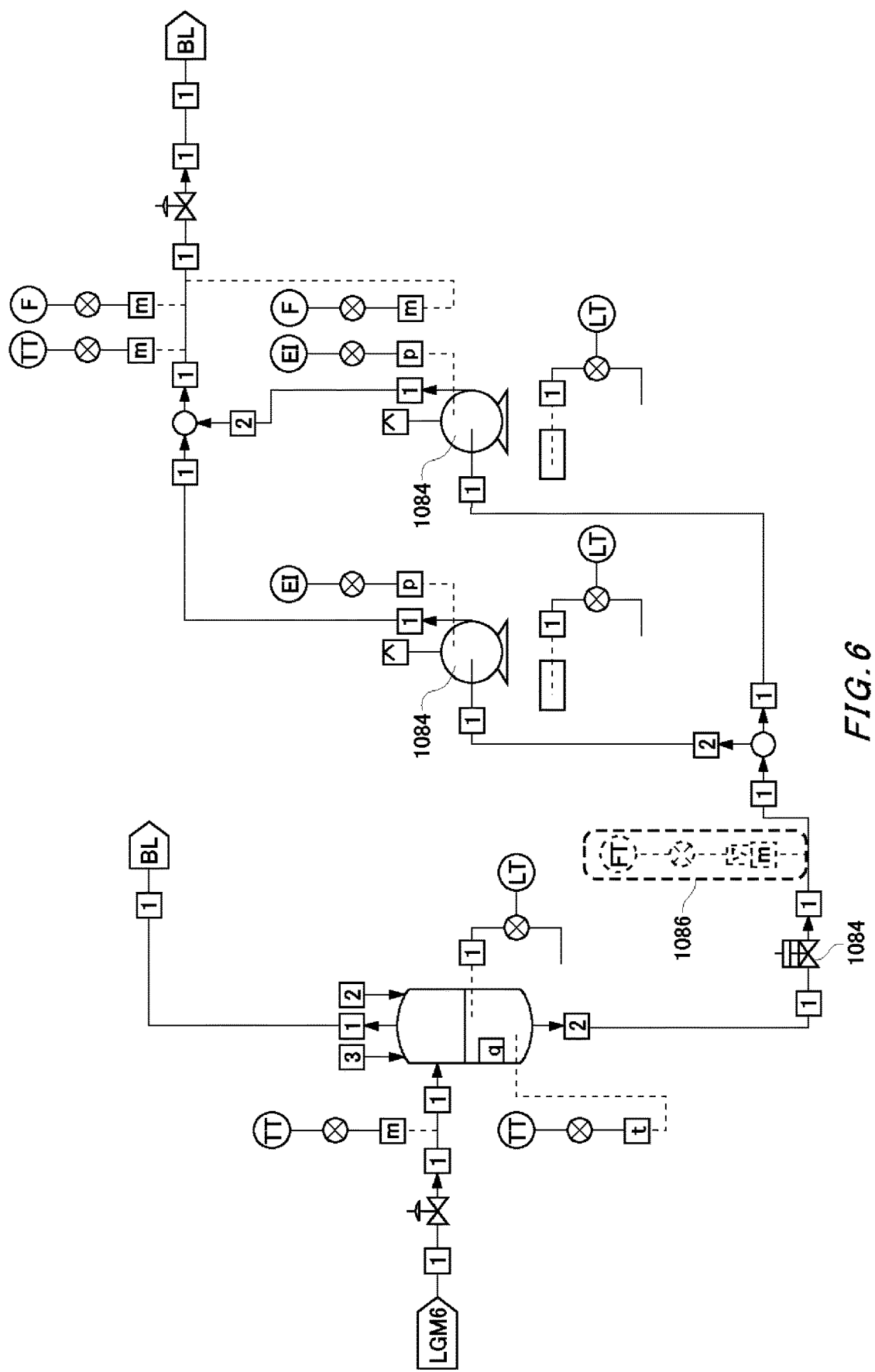
FIG. 6 shows one example of a first dynamic model 41 that is output by the screen output unit 1060 according to the present embodiment.

FIG. 6 shows one example of the third dynamic model 43 that is output by the screen output unit 1060 according to the present embodiment. Similar to FIG. 5, FIG. 6 shows an example in which the third dynamic model 43 is represented with figures such as symbols and items. It is desirable that the screen output unit 1060 displays the second difference from the first dynamic model 41 being a comparison reference even when displaying the third dynamic model 43 to make the user grasp the changed portions. FIG. 6 shows an example in which the second portion 1084 and a third portion 1086 of the first dynamic model 41 are adjusted and changed to the third dynamic model 43.

That is, the third dynamic model 43 has the second portion 1084 and the third portion 1086 as the second difference, and the screen output unit 1060 displays the second portion 1084 and the third portion 1086 in a different color from that of the portions that are not changed from the first dynamic model 41. As one example, the second portion 1084 is a device whose parameter is changed by the adjustment from the first dynamic model 41 to the third dynamic model 43. Also, the third portion 1086 is a deleted device by the adjustment. FIG. 6 shows an example in which there is one deleted device and three devices whose parameters are changed. The screen output unit 1060 may display, in different colors, the portions having the types of change that are different from each other in this way. For example, the screen output unit 1060 displays the second portion 1084 in yellow color and displays the third portion 1086 in red color.

FIG. 7 shows a first example of the first difference and the second difference that are output in a table format by the screen output unit 1060 according to the present embodiment. FIG. 7 shows an example in which the screen output unit 1060 outputs a display screen having a table that includes a first column, a second column and a third column. The first column is a column in which the at least one first difference and the at least one second difference are displayed next to each other in a column direction and are individually selectable and designatable. That is, the first column is a column in which the first difference (the difference between the first dynamic model and the second dynamic model) shown in the second column, and the second difference (the difference between the first dynamic model and the third dynamic model) shown in the third column are displayed next to each other in the column direction and is selectable. The first column in FIG. 7 shows the change added to the third dynamic model in a case where the second dynamic model 42 is set to be a reference (the comparison reference). FIG. 7 shows an example in which the changed portions included in the first difference and the second difference are respectively arrayed in the column direction along with checkboxes in the first column.

The second column is a column in which the at least one first difference is displayed in the same row as a row of the first column in which the at least one first difference is displayed. FIG. 7 shows an example in which the changed portions included in the first difference are respectively arrayed in the column direction in the second column. The third column is a column in which the at least one second difference is displayed in the same row as a row of the first column in which the at least one second difference is displayed. FIG. 7 shows an example in which the changed portions included in the second difference are respectively arrayed in the column direction in the third column.

Note that FIG. 7 shows an example in which the types of the changed portions are displayed, in the first column to the third column, by icons and the like, that can be visually recognized, along with the names of the devices and the like. For example, the first icon 1088 shows a unit that is a mark of a block. Also, the second icon 1090 shows a stream that is a mark of a socket. The third icon 1092 is a mark of a radio wave and shows signal lines.

Because the screen output unit 1060 outputs the first difference and the second difference in a table format in this way, detailed contents changed by the adjustment from the first dynamic model 41 to the second dynamic model 42 can be grasped by using the second column as a reference. Also, by using the third column as a reference, the detailed contents of the change from the first dynamic model 41 to the third dynamic model 43 can be grasped.

Also, the screen output unit 1060 may output the display screen that further recognizably displays each of the first difference and the second difference being either the addition or the deletion to or from the first dynamic model 41. For example, in the second column, unit "FTNG03", unit "HVFLR", unit "HVNG02" and unit "TENG07" are shown as a deletion 1094 that is deleted by the adjustment from the first dynamic model 41 to the second dynamic model 42.

Note that the screen output unit 1060 does not display, in the third column, the unit "FTNG03", the unit "HVFLR", the unit"HVNG02" and the unit "TENG07" as the deletion. That is, the portion shows that there is no change in the designs between the first plant and the second plant and no difference between the first dynamic model 41 and the third dynamic model 43 is extracted.

Therefore, in the example of FIG. 7 (in the case where the second dynamic model is set as the comparison reference), the screen output unit 1060 displays, in the first column, the unit "FTNG03", the unit "HVFLR", the unit "HVNG02" and the unit "TENG07" as an addition 1096. The screen output unit 1060 displays the deletion 1094 in red color and displays the addition 1096 in green color, for example.

As described above, the first column in FIG. 7 shows an example of the difference between the second dynamic model 42 and the third dynamic model 43, where the second dynamic model 42 is set as the comparison reference. Also, the screen output unit 1060 may also be able to interchange the display forms between such an addition 1096 and a deletion 1094. For example, the screen output unit 1060 shows, in the first column, the difference between the second dynamic model 42 and the third dynamic model 43, where the third dynamic model 43 is set as the comparison reference. The output screen of the screen output unit 1060 in this case is shown next.

FIG. 8 shows a second example in which the screen output unit 1060 according to the present embodiment shows the first difference and the second difference that are output in a table format. In FIG. 8, because the second column and the third column are substantially the same as the second column and the third column described by using FIG. 7, the descriptions for them are omitted here. The first column of FIG. 8 shows an example of the difference between the second dynamic model 42 and the third dynamic model 43, where the third dynamic model 43 is set as the comparison reference. That is, compared to the first column of FIG. 7, in the first column of FIG. 8, the addition 1096 and the deletion 1094 are displayed reversely from each other.

The screen output unit 1060 may be able to switch the display of FIG. 7 and the display of FIG. 8 in accordance with the designation and the like of the user. As described above, because the screen output unit 1060 recognizably displays the details of the first difference and the second difference of the dynamic model as the change history, the user can easily determine the adjustment required for the generation of the fourth dynamic model 44. Also, because the screen output unit 1060 displays the details of the first difference and the second difference along with the checkboxes that are individually selectable and designatable, in the example of FIG. 7, the user can easily select and designate the adjustment required for the fourth dynamic model 44 on a basis of the second dynamic model. Also, because the third dynamic model 43 is set as the comparison reference in the example of FIG. 8, the user can easily select and designate the adjustment required for the fourth dynamic model 44 on a basis of the third dynamic model 43.

Accordingly, the fourth dynamic model generating unit 1070 can generate the fourth dynamic model by incorporating the designated difference of the at least one first difference and the at least one second difference displayed on the display screen into the second dynamic model or the third dynamic model. Note that because the apparatus 1000 acquires the information of each of the dynamic models and of the first difference and the second difference, the fourth dynamic model generating unit 1070 can generate the fourth dynamic model 44 by incorporating the designated difference into at least one of the second dynamic model 42 and the third dynamic model 43.

Although an example in which the apparatus 1000 according to the present embodiment described above acquires the dynamic models from the generating apparatus 10 described by using FIG. 1 and FIG. 2 is described, the apparatus 1000 is not limited to this. The apparatus 1000 may also include a generating apparatus 10. The apparatus 1000 may also include parts of the generating apparatus 10. The apparatus 1000 may also include a dynamic simulator 40, for example. Also, the apparatus 1000 may further include the dynamic model generating apparatus 100 configured to automatically generate the dynamic model. The generating apparatus 10 that includes such a dynamic model generating apparatus 100 is described next.

Figure 9:
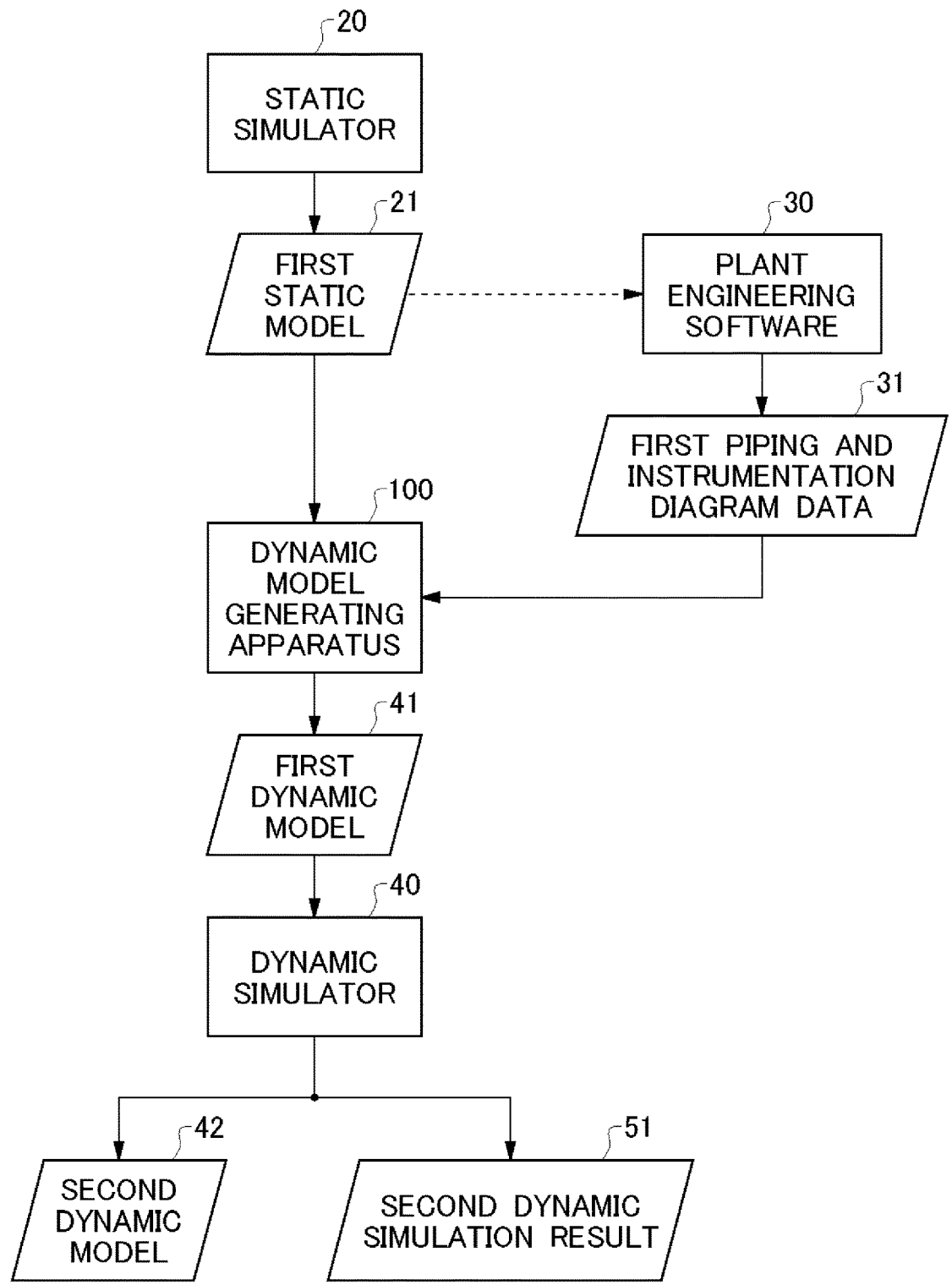
FIG. 9 shows a modified example of the generating apparatus 10 according to the present embodiment.

FIG. 9 shows a modified example of the generating apparatus 10 according to the present embodiment. In the generating apparatus 10 of the present modified example, operations that are substantially the same as those of the generating apparatus 10 according to the present embodiment shown in FIG. 1 are assigned with the same reference numerals, and the descriptions thereof are omitted. The generating apparatus 10 of the modified example further includes the dynamic model generating apparatus 100. The dynamic model generating apparatus 100 generates the first dynamic model 41 based on the first static model 21 that indicates a steady state of a first plant. The dynamic model generating apparatus 100 may acquire the information of a first static model 21 from the static simulator 20 and convert the first static model 21 to the first dynamic model 41.

For example, the dynamic model generating apparatus 100 generates the first dynamic model 41 including a plurality of devices respectively corresponding to a plurality of devices included in the first static model 21, and a connection relation between the devices corresponding to a connection relation between the plurality of devices included in the first static model 21. The dynamic model generating apparatus 100 may convert the first static model 21 into the first dynamic model 41 based on a known conversion method.

Also, the dynamic model generating apparatus 100 may also generate the first dynamic model 41 further based on the first piping and instrumentation diagram data 31 of the first plant. In this case, the dynamic model generating apparatus 100 acquires the first piping and instrumentation diagram data 31 from the plant engineering software 30. FIG. 9 shows an example in which the dynamic model generating apparatus 100 generates the first dynamic model 41 based on the first static model 21 and the first piping and instrumentation diagram data 31.

Accordingly, the dynamic model generating apparatus 100 can generate a more detailed first dynamic model 41. Although an example in which the dynamic model generating apparatus 100 according to the present embodiment generates the first dynamic model 41 is described in FIG. 9 as the above, the dynamic model generating apparatus 100 is not limited to this. The dynamic model generating apparatus 100 may also generate the third dynamic model 43.

Figure 10:
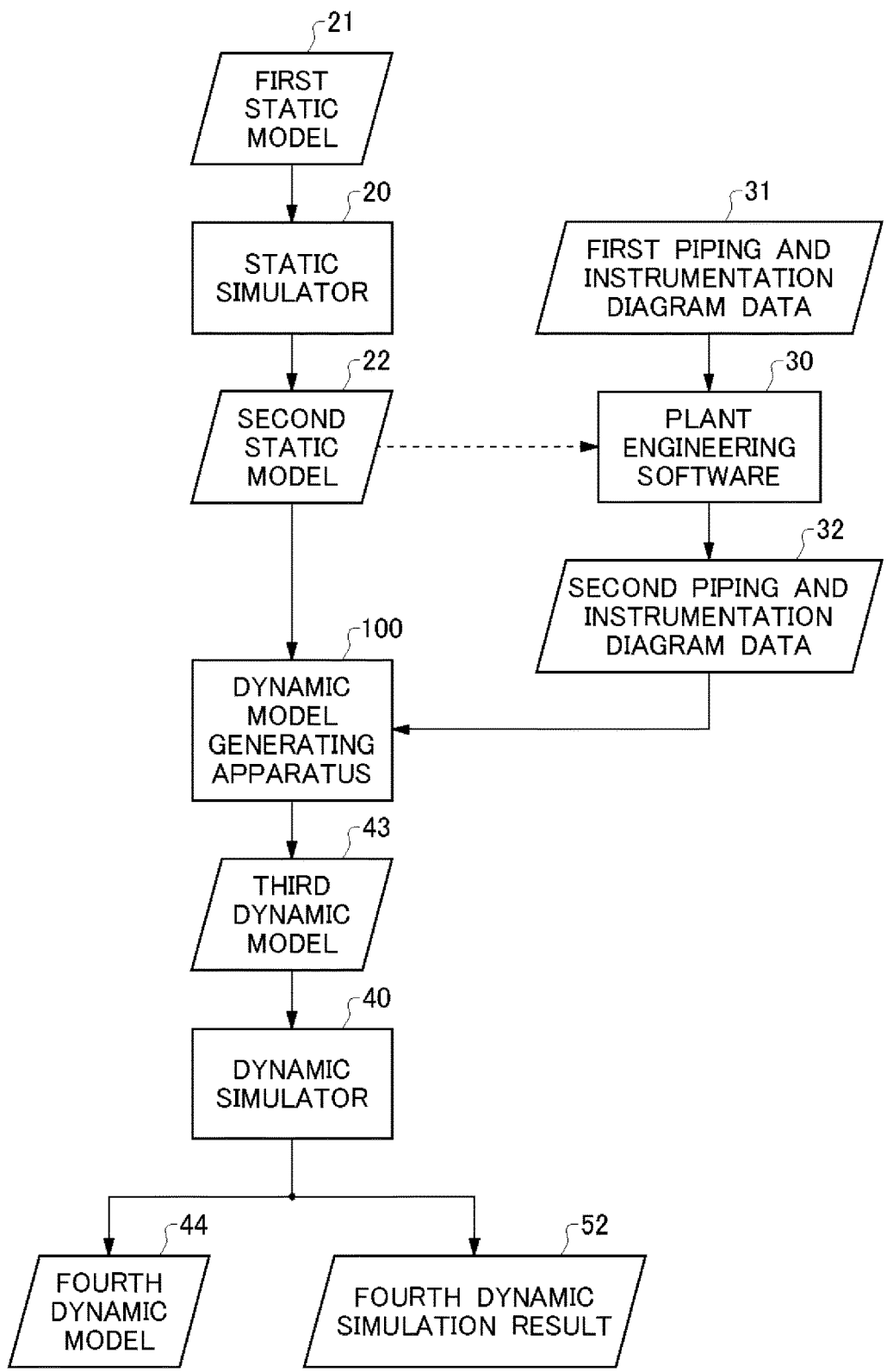
FIG. 10 shows an example in which the generating apparatus 10 according to the modified example generates a third dynamic model 43.

FIG. 10 shows an example in which he generating apparatus 10 according to a modified example generates the third dynamic model 43. The dynamic model generating apparatus 100 generates the third dynamic model 43 based on the second static model 22 that indicates a steady state of the second plant obtained by changing the first plant. Also, the dynamic model generating apparatus 100 may generate the third dynamic model 43 further based on the second piping and instrumentation diagram data 32 that is obtained by changing the first piping and instrumentation diagram data 31 of the first plant for the second plant that is obtained by changing the first plant. FIG. 10 shows an example in which the dynamic model generating apparatus 100 generates the third dynamic model 43 based on the second static model 22 and the second piping and instrumentation diagram data 32.

As described above, the dynamic model generating apparatus 100 can generate more detailed first dynamic model 41 and third dynamic model 43. Also, the model acquiring unit 1010 may acquire the first dynamic model 41 and the third dynamic model 43 from such a dynamic model generating apparatus 100. Because the dynamic model generating apparatus 100 can automatically generate the first dynamic model 41 and the third dynamic model 43, the efficiency of the plant design can further improved.

Such a dynamic model generating apparatus 100 is described next. Note that an example in which the dynamic model generating apparatus 100 generates the first dynamic model 41 is used for the description of the dynamic model generating apparatus 100. Because the generation of the third dynamic model 43 by the dynamic model generating apparatus 100 is similar to the generation of the first dynamic model 41, the description is omitted here.

Figure 11:
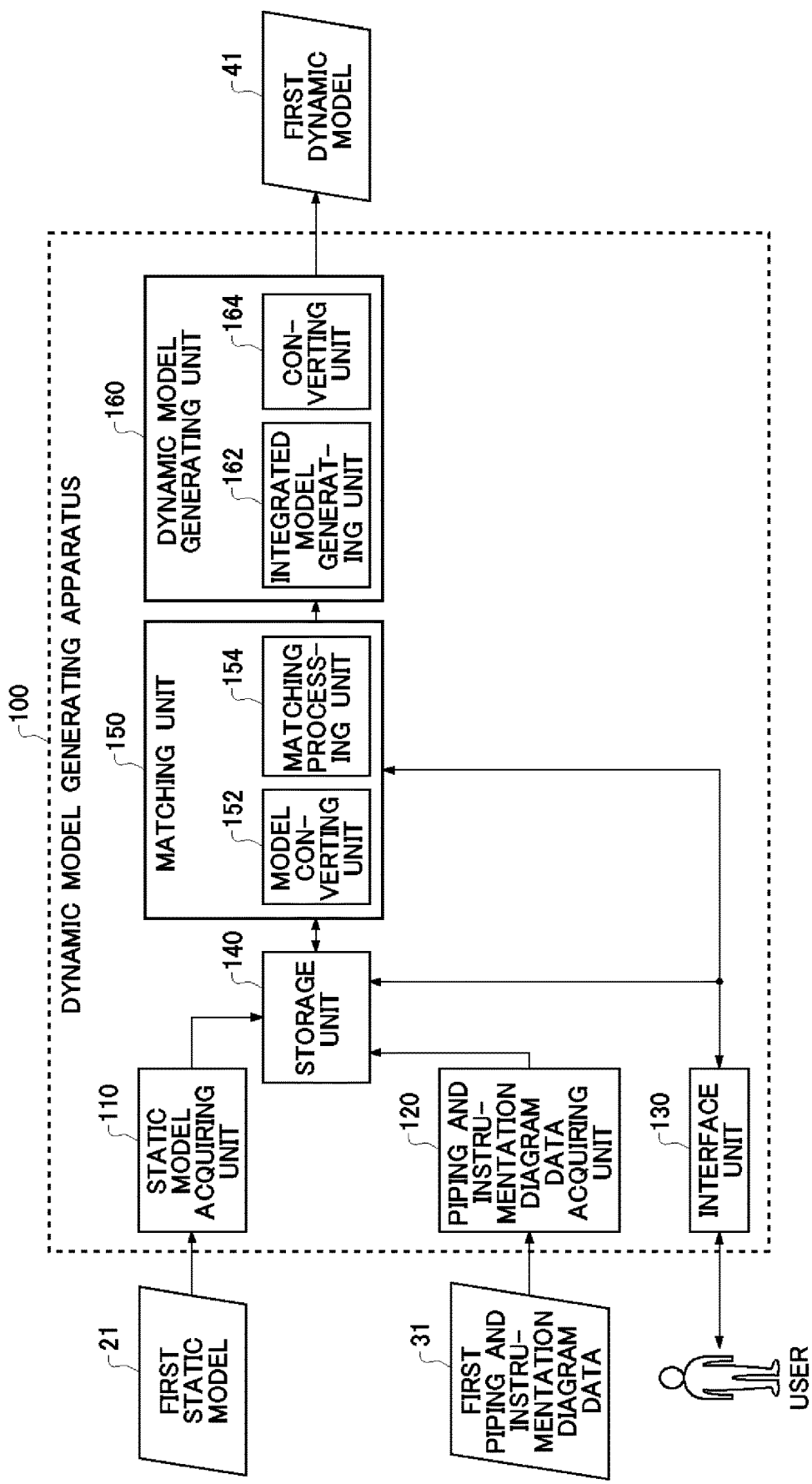
FIG. 11 shows a configuration example of a dynamic model generating apparatus 100 according to the present embodiment.

FIG. 11 shows a configuration example of the dynamic model generating apparatus 100 according to the present embodiment. The dynamic model generating apparatus 100 can generate the first dynamic model 41 by matching devices to each other, the devices respectively included in the first static model 21 and the first piping and instrumentation diagram data 31 that have no compatibility with each other, based on their relations and the like. The dynamic model generating apparatus 100 includes a static model acquiring unit 110, a piping and instrumentation diagram data acquiring unit 120, an interface unit 130, a storage unit 140, a matching unit 150 and a dynamic model generating unit 160.

The static model acquiring unit 110 acquires the first static model 21 indicating the steady state of the first plant. The static model acquiring unit 110 may receive the first static model 21 that is output from the static simulator 20. Also, the static model acquiring unit 110 may also read and acquire the first static model 21 stored in a database and the like. In this case, the static model acquiring unit 110 may acquire the first static model 21 via a network and the like. Also, the static model acquiring unit 110 may also acquire the first static model 21 according to an input from the user.

The piping and instrumentation diagram data acquiring unit 120 acquires the first piping and instrumentation diagram data 31 of the first plant. The piping and instrumentation diagram data acquiring unit 120 may receive the first piping and instrumentation diagram data 31 that is output from the plant engineering software 30. Also, the piping and instrumentation diagram data acquiring unit 120 may also read and acquire the first piping and instrumentation diagram data 31 stored in the database and the like. In this case, the piping and instrumentation diagram data acquiring unit 120 may acquire the first piping and instrumentation diagram data 31 via the network and the like. Also, the piping and instrumentation diagram data acquiring unit 120 may also acquire the first piping and instrumentation diagram data 31 according to an input of the user.

The interface unit 130 receives an input, a selection, a designation and the like from the user. Also, the interface unit 130 may display, to the user, models, data, drawings and the like in a process in which the dynamic model generating apparatus 100 generates the first dynamic model 41. The interface unit 130 may have a display screen, an input device and the like that give and receive information. Also, the interface unit 130 may give and receive the information through wired or wireless communications with devices such as a terminal and a mobile terminal used by the user. Note that the interface unit 130 may also be the interface unit 1080 described in FIG. 3.

The storage unit 140 stores the first static model 21, the first piping and instrumentation diagram data 31, and input data and the like from the user. Also, the storage unit 140 may also store the information of the first dynamic model 41 generated by the dynamic model generating apparatus 100.

Also, the storage unit 140 may be able to store the data on which the dynamic model generating apparatus 100 performs processing. The storage unit 140 may also respectively store data, models, intermediate data, a calculation result, parameters and the like calculated (or utilized) in a process in which the dynamic model generating apparatus 100 generates the first dynamic model 41. Also, the storage unit 140 may supply, in accordance with a request of each unit in the dynamic model generating apparatus 100, the stored data to the unit that has made the request.

The matching unit 150 matches devices included in the first static model 21 with devices included in the first piping and instrumentation diagram data 31 to identify a device-to-device correspondence relation. The matching unit 150 may perform the matching based on device information and the like added to the device. Also, the matching unit 150 may perform the matching based on a connection relation in the first static model 21 and a connection relation in the first piping and instrumentation diagram data 31. The matching unit 150 may respectively convert the first static model 21 and the first piping and instrumentation diagram data 31 that have no compatibility with each other into comparable models, and then perform the matching. The matching unit 150 has a model converting unit 152 and a matching processing unit 154.

The model converting unit 152 respectively converts the first static model 21 into a first model based on the first static model 21, and the first piping and instrumentation diagram data 31 into a second model based on the first piping and instrumentation diagram data 31, the first model and the second model having a common representation format. The model converting unit 152 may perform conversion into a common representation format for each device respectively arranged in the first static model 21 and the first piping and instrumentation diagram data 31 to generate the first model and the second model. Here, the common representation format shows information of connections between the respective elements or an attribute and the like of each element included in the first static model 21 and the first piping and instrumentation diagram data 31 in a text format. For example, some or all of the information or the attribute and the like may also be shown as data in an Extensible Markup Language (XML) format.

The matching processing unit 154 matches the devices included in the first model with the devices included in the second model. The matching processing unit 154 may match the devices to each other based on names of the devices and the like. Also, the matching processing unit 154 may match the devices to each other in accordance with the designation of the user. Also, the matching processing unit 154 may also match the devices to each other based on topology (geometrical information), an attribute, a connection state with another device, and the like of a device.

The dynamic model generating unit 160 generates the first dynamic model 41 that is a model calculating a dynamic state of the plant based on the matching result by the matching unit 150. The dynamic model generating unit 160 generates the first dynamic model 41 by using connection relations between a plurality of devices in the first piping and instrumentation diagram data 31 and parameters of devices respectively corresponding to a plurality of devices in the first static model 21. The dynamic model generating unit 160 has an integrated model generating unit 162 and a converting unit 164.

The integrated model generating unit 162 generates an integrated model by using the matching result and integrating the first model and the second model. The integrated model generating unit 162 generates the integrated model based on a connection between the matched devices, for example. The integrated model generating unit 162 generates the connection information of the devices in the integrated model based on the matching result and the second model, for example. Also, the integrated model generating unit 162 may generate the device parameter, the physical property information and the like of the integrated model based on the matching result and the first model. The integrated model may have a common representation format with those of the first model and the second model.

The converting unit 164 converts the integrated model generated by the integrated model generating unit 162 into the first dynamic model 41. For example, the converting unit 164 generates the first dynamic model 41 by using equations that use differentiation and integration of a plurality of parameters based on physical connection relations between respective devices and operation conditions of the respective devices in the integrated model.

The dynamic model generating apparatus 100 according to the present embodiment as described above can generate the first dynamic model 41 based on the first static model 21 and the first piping and instrumentation diagram data 31. Therefore, the dynamic simulator 40 can output the second dynamic model 42 and the second dynamic simulation result 51 by using the first dynamic model 41 generated by the dynamic model generating apparatus 100, simulating the operations of the plant, and adjusting each parameter and the like. The operation of such a dynamic model generating apparatus 100 is described next.

Figure 12:
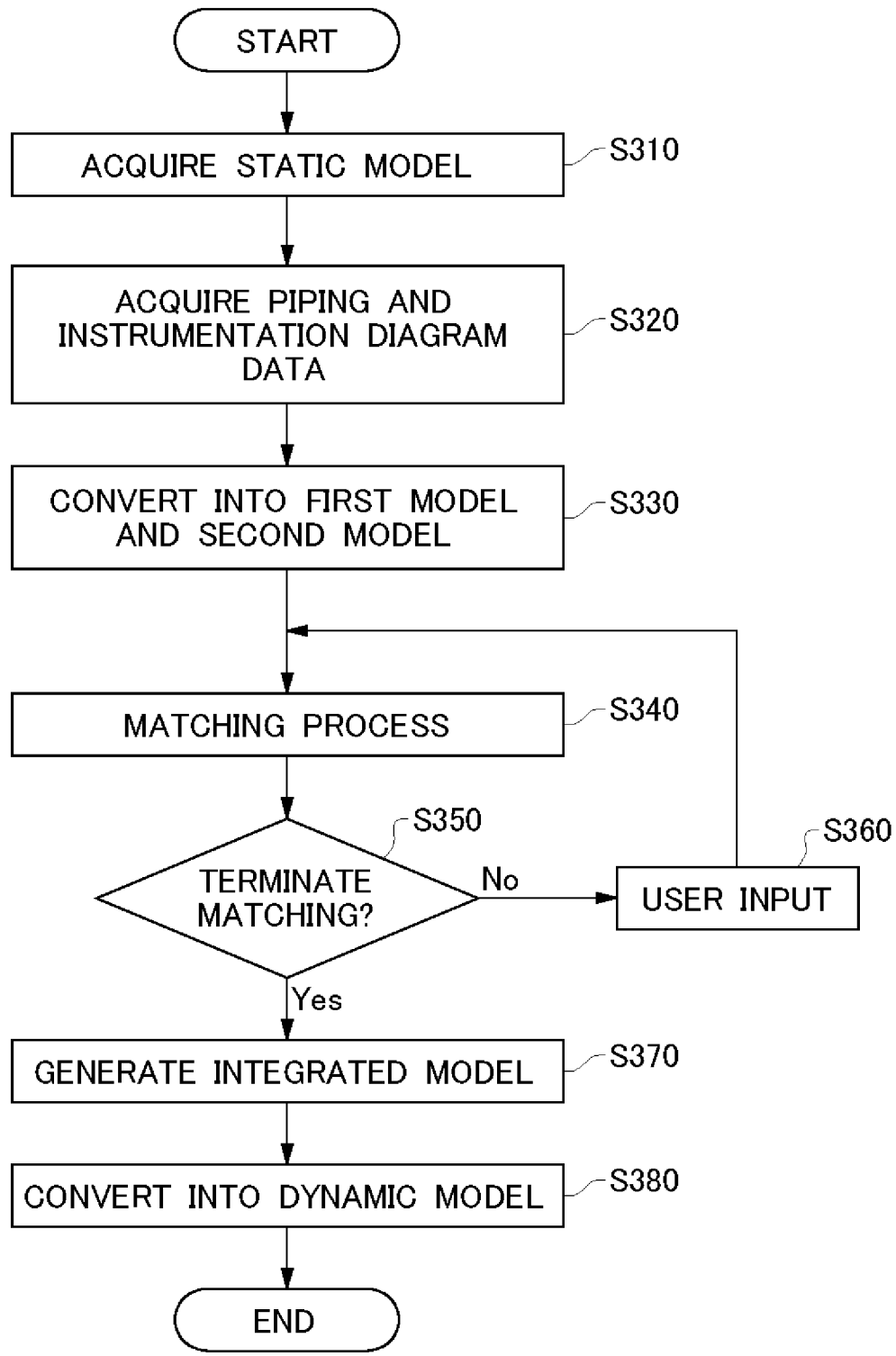
FIG. 12 shows one example of an operation flow of the dynamic model generating apparatus 100 according to the present embodiment.

FIG. 12 shows one example of an operation flow of the dynamic model generating apparatus 100 according to the present embodiment. The dynamic model generating apparatus 100 generates the first dynamic model 41 by performing the operation flow shown in FIG. 12.

First, the static model acquiring unit 110 acquires the first static model 21 (S310). The static model acquiring unit 110 acquires the first static model 21 with a data file in a text format, as one example. The static model acquiring unit 110 may store the acquired first static model 21 in the storage unit 140. Also, the static model acquiring unit 110 may also supply the acquired first static model 21 to the matching unit 150.

Next, the piping and instrumentation diagram data acquiring unit 120 acquires the first piping and instrumentation diagram data 31 (S320). The piping and instrumentation diagram data acquiring unit 120 acquires the first piping and instrumentation diagram data 31 with a data file in a text format, as one example. The piping and instrumentation diagram data acquiring unit 120 may store the acquired first static model 21 in the storage unit 140. Also, the piping and instrumentation diagram data acquiring unit 120 may also supply the acquired first piping and instrumentation diagram data 31 to the matching unit 150.

Next, the model converting unit 152 respectively converts the first static model 21 into the first model and the first piping and instrumentation diagram data 31 into the second model (S330). The model converting unit 152 converts the first static model 21 into the first model by using a first conversion table, for example. The first conversion table may be a table in which a correspondence relation between the first static model 21 and the first model is registered in advance. In this case, the first conversion table may be stored in the storage unit 140.

That is, the model converting unit 152 may read the first conversion table from the storage unit 140 to convert the first static model 21 into the first model. The first model may be a model including device information added to each device arrange in the first static model 21. The device information may include the names, the attributes and the like of the devices.

Also, the model converting unit 152 converts the first piping and instrumentation diagram data 31 into the second model by using a second conversion table, for example. The second conversion table may be a table in which a correspondence relation between the first piping and instrumentation diagram data 31 and the second model is registered in advance. In this case, the second conversion table may be stored in the storage unit 140. That is, the model converting unit 152 may read the second conversion table from the storage unit 140 to convert the first piping and instrumentation diagram data 31 into the second model. The second model may be a model including device information added to each device arranged in the first piping and instrumentation diagram data 31. The device information may include the names, the attributes and the like of the devices.

Next, the matching processing unit 154 matches the devices included in the first model with the devices included in the second model (S340). The matching processing unit 154 identifies a device-to-device correspondence relation based on a result of comparing the device information added to the devices included in the first static model 21 with the device information added to the devices included in the first piping and instrumentation diagram data 31. For example, the matching processing unit 154 extracts sets of devices whose names match each other, as corresponding devices, the names respectively included in the device information of the respective devices included in the first model and included in the device information of the respective devices included in the second model.

Also, instead of the names of the devices, the matching processing unit 154 may also extract, respectively from the first model and the second model, sets of devices whose types, attributes, set parameters and the like match with each other, as the corresponding devices. The matching processing unit 154 may set the extracted corresponding devices as a matching result.

Next, the matching processing unit 154 determines whether to continue or terminate the matching (S350). For example, the matching processing unit 154 may display the matching result to the user via the interface unit 130 to make the user designate to continue (S350: No) or terminate (S350: Yes) the matching.

Alternatively, the matching processing unit 154 may calculate a percentage of the matched devices among all of the devices included in the first static model 21 as a matching rate, and determine whether to continue the matching or not in accordance with the matching rate. For example, the matching processing unit 154 may determine to terminate the matching (S350: Yes) if the matching rate exceeds a predetermined threshold. Also, the matching processing unit 154 may determine to continue the matching (S350: No) if the matching rate is equal to or less than the predetermined threshold.

If the matching processing unit 154 determines to continue the matching (S350: No), the matching processing unit 154 receives an input from the user via the interface unit 130 (S360). An indication of a type and the like of the matching that is the next to be performed may also be input in the interface unit 130. An indication indicating that the matching result is appropriate may also be input in the interface unit 130 by the user.

Also, if a set of devices, among the matching result, that actually do not correspond to each other is extracted, an indication indicating that the set of devices is excluded from the matching result may be input in the interface unit 130 by the user. Also, a designation indicating that a first device in the first static model 21 and a second device in the first piping and instrumentation diagram data 31 are the corresponding devices may also be input in the interface unit 130 from the user. That is, if there are devices that cannot be matched with the other left, the matching processing unit 154 may further receive a designation of a device-to-device correspondence relation between the devices in the first static model 21 and the devices in the first piping and instrumentation diagram data 31.

The matching processing unit 154 performs matching processing in response to the indication of the user (S340). Also, the matching processing unit 154 may increase or decrease a number of sets of corresponding devices as the matching result in accordance with the indication of the user. Also, if there is another set of devices corresponding to the designation of the user, the matching processing unit 154 may similarly increase or decrease the number of the sets of the corresponding devices. Also, the matching processing unit 154 may also perform a different type of matching from that of the previous matching. The matching processing unit 154 may repeat the operations in S340 to S360 until the matching is terminated. Also, if the operations in S340 to S360 have been repeated for a predetermined times, the matching processing unit 154 may also terminate the matching.

Next, the integrated model generating unit 162 generates the integrated model by using the matching result (S370). The integrated model generating unit 162 may set, for example, connection information of parts including at least the matched devices among the second model as the connection information of the devices in the integrated model. Also, the integrated model generating unit 162 may set the parameters, the physical property information and the like of the matched devices included in the first model as the parameters, the physical property information and the like of the corresponding devices in the integrated model.

Next, the converting unit 164 converts the integrated model into the first dynamic model 41 (S380). Accordingly, the dynamic model generating apparatus 100 of the present embodiment can output the first dynamic model 41. Therefore, the dynamic simulator 40 can simulate the operation of the first plant by using the first dynamic model 41 generated by the dynamic model generating apparatus 100.

As described above, because the dynamic model generating apparatus 100 of the present embodiment converts the first static model 21 and the first piping and instrumentation diagram data 31 that have different formats from each other into the first model and the second model that have substantially the same format, the matching unit 150 can easily perform the matching. Also, the dynamic model generating apparatus 100 can automatically perform the matching by searching for the devices having the matched device information.

Also, the dynamic model generating apparatus 100 makes the user check the matching result to acquire an indication for a further matching. Accordingly, the dynamic model generating apparatus 100 can also match the devices having device information that do not match with each other. Also, the user can acquire the matching result with high perfection by only indicating lacking to-be-matched targets based on the result obtained by the matching. Also, the user can acquire the matching result with high perfection by only indicating a wrong matching result based on the result obtained by the matching.

Also, the integrated model generating unit 162 uses the first model converted from the first static model 21 having the device parameter and the physical property information to determine the device parameter, the physical property information and the like of the devices in the integrated model. Then, the integrated model generating unit 162 uses the second model converted from the first piping and instrumentation diagram data 31 having the detailed connection information of the devices to determine the connection information of the devices and the like in the integrated model. Accordingly, the dynamic model generating apparatus 100 can extract and incorporate, from an appropriate model and into the integrated model, the device parameters, the physical property information, the connection information of the devices and the like that are necessary for the first dynamic model 41.

Also, the dynamic model generating apparatus 100 can easily convert the integrated model into the first dynamic model 41 based on the matching result by setting substantially the same format to a format that is possible to be converted into the first dynamic model 41. In this way, because the dynamic model generating apparatus 100 according to the present embodiment can easily generate the first dynamic model 41 that can be operated by the dynamic simulator 40, working hours and labor of a user can be reduced. Because such working hours and labor of the user are greater as a scale of the plant is larger, it is also possible to reduce the man-hours of the user for manually creating the first dynamic model 41 to approximately 60%, for example.

Also, because the dynamic model generating apparatus 100 can generate the first dynamic model 41 without using the dynamic simulator 40, an appropriate first dynamic model 41 can be generated irrelevantly to the proficiency level of the user to the dynamic simulator 40. As described above, according to the dynamic model generating apparatus 100 according to the present embodiment, the working efficiency of the generation of the first dynamic model 41 can be improved and the plant design can be smoothly performed.

FIG. 13 shows one example of the first model converted by the model converting unit 152 according to the present embodiment. Also, FIG. 14 shows one example of the second model converted by the model converting unit 152 according to the present embodiment. FIG. 13 and FIG. 14 show one example of the conversion result relative to the same device. Even if the device is the same, because the first static model 21 and the first piping and instrumentation diagram data 31 respectively have information corresponding to purposes, the first model and the second model, that have the format in common with each other, converted by the model converting unit 152 still almost have no item in common with each other in some cases.

In the cases of the examples of FIG. 13 and FIG. 14, for example, because the "CV1" being a "tag name" is in common with each other as a name of a device, the matching processing unit 154 sets the devices having the "CV1" being the tag name in the first model and the second model as the corresponding devices. However, for example, in the examples of FIG. 13 and FIG. 14, if the tag names are different from each other it is difficult to automatically extract the devices as the corresponding devices. Note that although FIG. 13 and FIG. 14 show the first model and the second model in a table format for an easy understanding, the format is not limited to this and the first model and the second model may be described in various formats. The first model and the second model are shown in XML data, for example.

Figure 15:
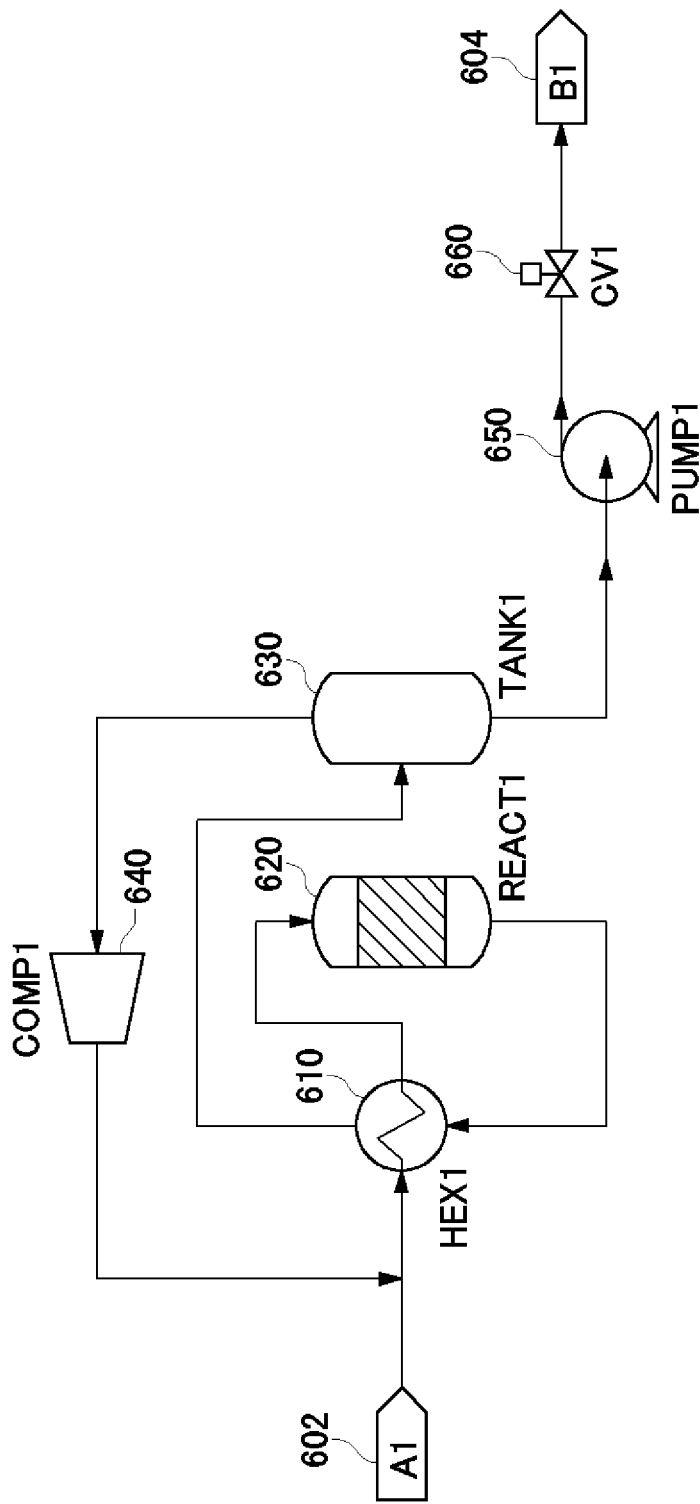
FIG. 15 shows one example of a first static model 21 according to the present embodiment.

FIG. 15 shows one example of the first static model 21 according to the present embodiment. FIG. 15 is an example of the first static model 21 described for a plurality of devices from an input unit 602 to an output unit 604. Note that in FIG. 15 the description for the physical property information of each device is omitted. The first static model 21 includes a heat exchanger 610, a reactor 620, a tank 630, a compressor 640, a pump 650 and a valve 660.

Figure 16:
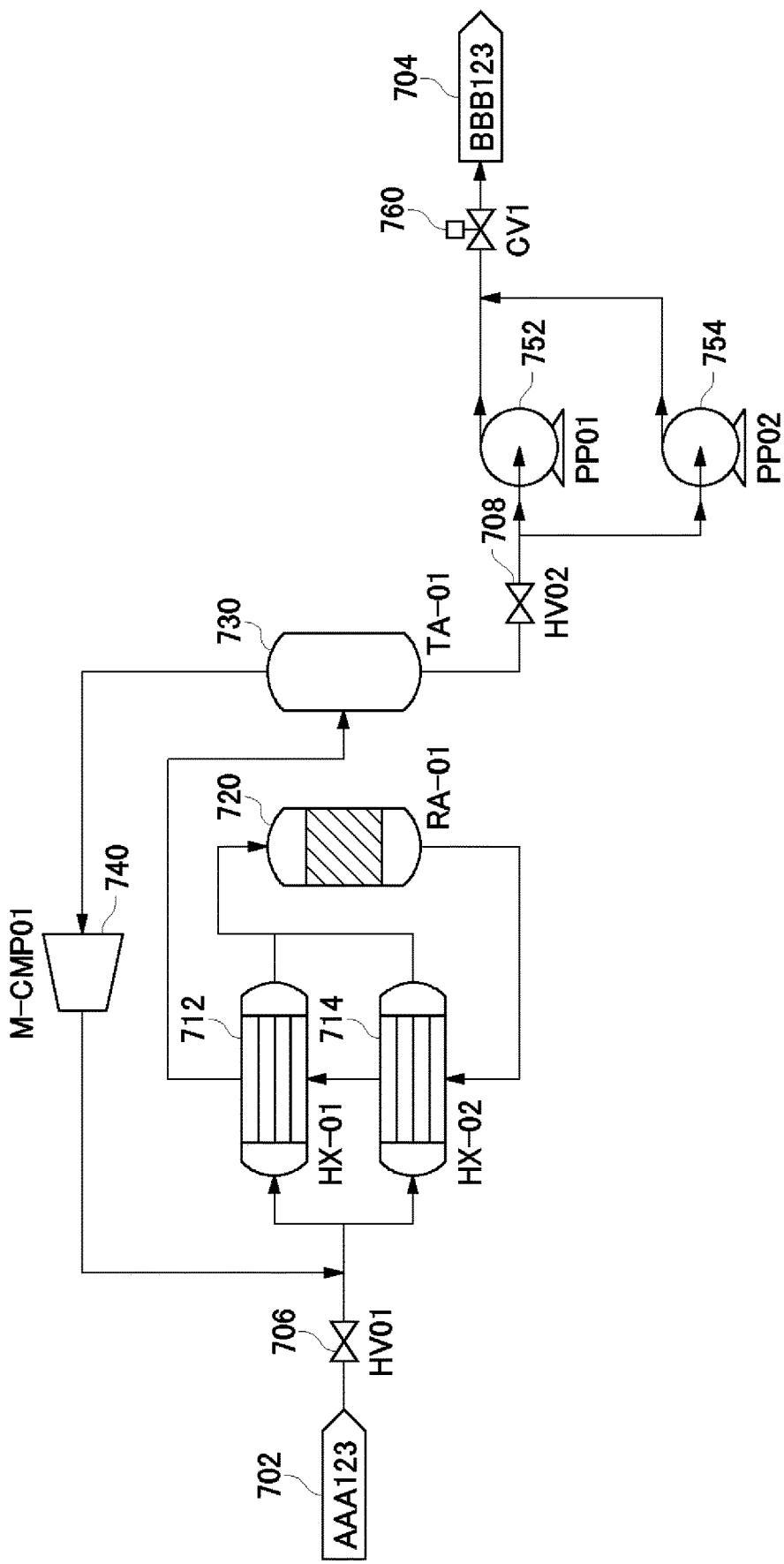
FIG. 16 shows one example of first piping and instrumentation diagram data 31 according to the present embodiment.

FIG. 16 shows one example of the first piping and instrumentation diagram data 31 according to the present embodiment. FIG. 16 is an example of the first piping and instrumentation diagram data 31 described for a plurality of devices from an input unit 702 to an output unit 704. The first piping and instrumentation diagram data 31 includes a valve 706, a first heat exchanger 712, a second heat exchanger 714, a reactor 720, a tank 730, a compressor 740, a valve 708, a first pump 752, a second pump 754 and a valve 760.

The first piping and instrumentation diagram data 31 shown in FIG. 16 is data indicating parts substantially the same as those of the first static model 21 shown in FIG. 15. Because the first piping and instrumentation diagram data 31 has more detailed connection information of the devices than that of the first static model 21, information of the devices such as the valve 706 and the valve 708 have been added thereto, for example. Note that the first piping and instrumentation diagram data 31 does not include the physical property information and the like of each device.

Comparing FIG. 15 with FIG. 16, the reactor 620 and the reactor 720, the tank 630 and the tank 730, the compressor 640 and the compressor 740, and the valve 660 and the valve 760 are respectively the corresponding devices, and it is desirable to extract these devices by the matching. However, these devices may be described by different names and attributes, as described in FIG. 13 and FIG. 14. For example, the name of one of the reactor 620 and the reactor 720 is "REACT1" and the name of the other thereof is "RA-01", and accordingly, it is difficult to automatically match the devices.

Also, in the first static model 21, the heat exchanger 610 and the pump 650 are respectively shown as one ideal device. On the other hand, in the first piping and instrumentation diagram data 31, two devices, such as the first heat exchanger 712 and the second heat exchanger 714, and the first pump 752 and the second pump 754, are shown, and a configuration and a connection may be different from those in the first static model 21. This is a result obtained by connecting a plurality of devices in parallel or in series by taking installation locations, device performance and the like into account to meet the specification of the device that is considered in the first static model 21, and the first piping and instrumentation diagram data 31 shows that the configuration diagram is closer to the design drawing of the actual plant. Note that even in this case, because the names of the plurality of devices may be respectively different and the connection relations are also different, it is difficult to automatically perform the matching.

It is described that the dynamic model generating apparatus 100 of the present embodiment can perform the matching by receiving the indication from the user in such a case. In addition to this, the dynamic model generating apparatus 100 may also perform the matching by taking a relation of the device information, the connection relation between the devices and the like into account. For example, the dynamic model generating apparatus 100 registers the relation of the device information in advance.

In the examples of FIG. 13 and FIG. 14, for example, the dynamic model generating apparatus 100 stores in advance, in the storage unit 140, that the "valve object" and the "ball valve" mean the devices that have different names from each other but correspond to each other. Also, in the examples in FIG. 15 and FIG. 16, the dynamic model generating apparatus 100 stores in advance, in the storage unit 140, that the "REACT1" and the "RA-01" mean the devices that have different names from each other but correspond to each other. The matching processing unit 154 can determine whether the devices even having different names from each other are the corresponding devices or not by reading such relation of the device information as a reference from the storage unit 140, and can match the devices.

Also, the matching processing unit 154 may also identify a device-to-device correspondence relation based on the result of comparing the connection relation between the devices in the first static model 21 with the connection relation between the devices in the first piping and instrumentation diagram data 31. For example, the matching processing unit 154 may determine that the valve 660 connected to the output unit 604 and the valve 760 connected to the output unit 704 are the corresponding devices. Note that because the valve 660 and the valve 760 have the same name "CV1", the matching processing unit 154 may also determine that the valve 660 and the valve 760 are the corresponding devices based on the name.

Then, the matching processing unit 154 compares the pump 650 that is connected to an input end of the valve 660 with the first pump 752 and the second pump 754 that are connected to an input end of the valve 760 after matching the valve 660 with the valve 760. The connection between the first pump 752 and the second pump 754 is a parallel connection in which the input ends of the two devices are connected and so are the output ends of the two devices. That is, it can be determined that one device in the first static model 21 is realized by two devices, that is, the first pump 752 and the second pump 754 in the first piping and instrumentation diagram data 31. In such a case, the matching processing unit 154 may determine that the pump 650, and the first pump 752 and the second pump 754 are the corresponding devices.

Also, after matching the pump 650 with the first pump 752 and the second pump 754, the matching processing unit 154 compares the tank 630 connected to an input end of the pump 650 with the valve 708 connected to an input end of the first pump 752 and to an input end of the second pump 754. In the connection to the tank 630, an input end of the tank 630 is connected to one device and two output ends of the tank 630 are respectively connected to one device. An input end of the valve 708 is similarly connected to one device, but there is only one output end on the valve 708. Here, the matching processing unit 154 may determine that the tank 630 and the valve 708 are not the corresponding devices.

The matching processing unit 154 may also further compare a next device connection after performing the determination of the tank 630 and the valve 708. For example, because the first piping and instrumentation diagram data 31 has more detailed connection information of the devices than that of the first static model 21, the matching processing unit 154 may determine that the valve 708 in the first piping and instrumentation diagram data 31 is the device that does not exist in the first static model 21. Then, the matching processing unit 154 compares the tank 630 with the tank 730 connected to the input end of the valve 708. Further, because the connection in the tank 630 is in substantially the same form as that of the connection in the tank 730, the matching processing unit 154 may determine that the tank 630 and the tank 730 are the corresponding devices.

In this way, the matching processing unit 154 may identify the correspondence relation between the devices based on the connection information of the devices. Accordingly, the matching processing unit 154 can perform the matching even if the names of the devices are different from each other. Also, the matching processing unit 154 may also identify the corresponding devices by performing another matching method of a different type, such as matching according to the names of the devices, and then further perform the matching processing from the connection relation between the identified devices.

Also, a designation indicating that a first device in the first static model 21 and a second device in the first piping and instrumentation diagram data 31 are the corresponding devices may be input in the matching processing unit 154. Such an input may be performed by the operation in S360 in FIG. 12, or may alternatively be made from the interface unit 130 in the operation in S340. The matching processing unit 154 may further identify, in response to receiving the designation, a device-to-device correspondence relation based on a result of respectively comparing a connection relation between the first device and each device in the first static model 21 with a connection relation between the second device and each device in the piping and instrumentation diagram data.

Also, as described in FIG. 12 as well, the matching processing unit 154 can make the user check whether the matching is appropriate or not. Therefore, the matching processing unit 154 can accurately perform a more detailed matching. Note that the matching performed by the dynamic model generating apparatus 100 based on the relation between the device information, the connection relation between the devices and the like may also be performed based on a known technology, that is called ontology, in computer science, information science and the like.

Here, the ontology may be explained as a formal representation in which knowledge is considered as a set of relations between concepts. For example, by defining a word using a plurality of concepts and relations between the concepts, the word can be distinguished from another word, can be discriminated from a homonym, and can be determined to be a synonym for another word although having different spelling and so on, so that it is possible that the word can be effectively treated as knowledge. As one example, by associating the word "pipe" with concepts "cylinder", "tubular", "gas" and the like, it can be known that the word "pipe" means a tube for passing liquid, gas and the like therethrough, and it can be determined that the word "pipe" is not a "pipe" indicating a tool for smoking a cigarette, a wind instrument, and a function of delivering a value and the like of data in a program. The ontology may also be what described in Riichiro MIZOGUCHI, Science of Intelligence, Ohmsha, Jan. 20, 2005, and may also be what described in What are ontologies, Retrieved Nov. 20, 2017, from https://www.ontotext.com/knowledgehub/fundamentals/what-are-ontologies.

Here, association information according to such ontology may be defined for each device in the first static model 21 and each device in the first piping and instrumentation diagram data 31, to be utilized for the matching. For example, the model converting unit 152 uses the ontology to convert the first static model 21 into the first model and convert the first piping and instrumentation diagram data 31 into the second model.

Figure 17:
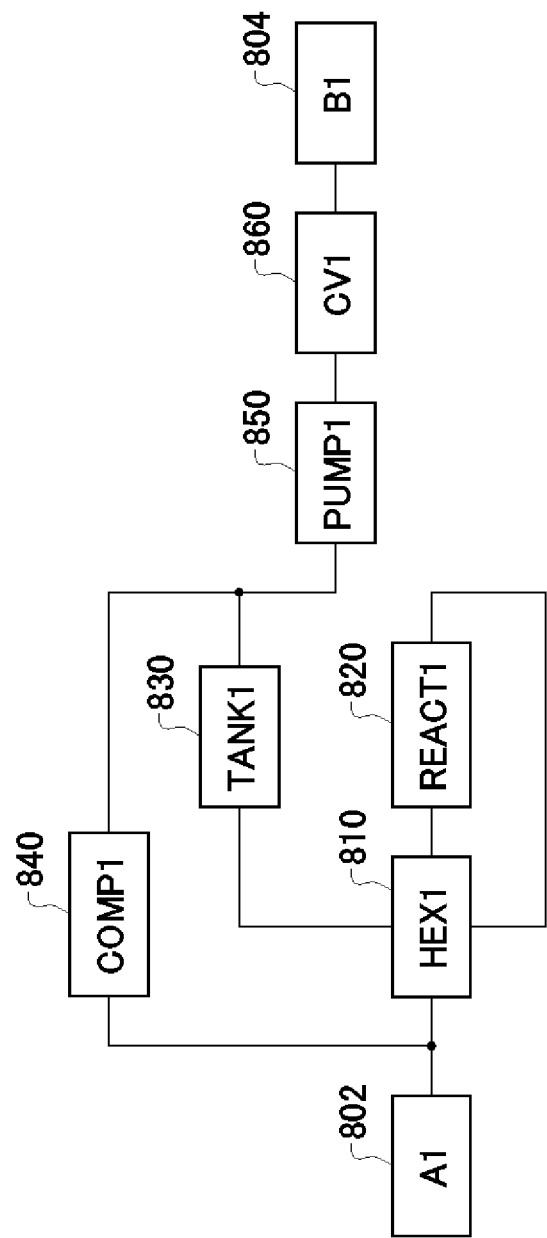
FIG. 17 shows one example of the first model converted by using ontology by the model converting unit 152 according to the present embodiment.

FIG. 17 shows one example of the first model converted by using the ontology by the model converting unit 152 according to the present embodiment. FIG. 17 shows a connection relation between the respective devices from the input unit 802 to the output unit 804. In the first model, information of each device in the first static model 21 and the connection relation between the respective devices shown in FIG. 15 are incorporated. The first model shows conversion results respectively corresponding to the devices. For example, the heat exchanger 610 is converted into the device 810 having the name "HEX1", the reactor 620 is converted into the device 820 having the name "REACT1", the tank 630 is converted into the device 830 having the name "TANK1", the compressor 640 is converted into the device 840 having the name "COMP1", the pump 650 is converted into the device 850 having the name "PUMP1", and the valve 660 is converted into the device 860 having the name "CV1".

Note that the association information according to the ontology is associated with each device shown in FIG. 17. For example, the device 860 has type information being the "valve object", and accordingly, pieces of association information being the "valve object" and the "ball valve" are associated with the device 860. That is, the association information meaning the valve is associated with the device 860. Also, association information showing that the device associated with the association information being the "pump" may be connected may also be associated with the device 860.

Figure 18:
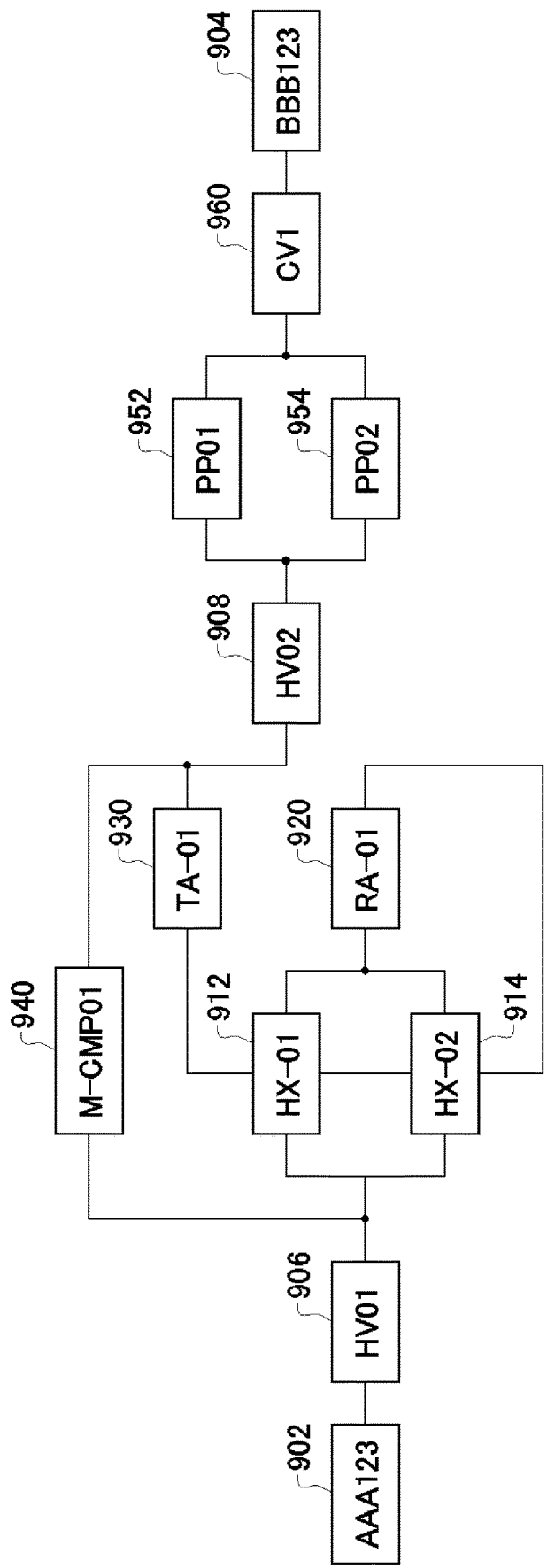
FIG. 18 shows one example of a second model converted by using ontology by the model converting unit 152 according to the present embodiment.

FIG. 18 shows one example of the second model converted by using the ontology by the model converting unit 152 according to the present embodiment. FIG. 18 shows a connection relation between the respective devices from the input unit 902 to the output unit 904. Similar to the first model, in the second model, information of the respective devices in the first piping and instrumentation diagram data 31 shown in FIG. 16 and the connection relation between the respective devices are incorporated. Also, the association information by the ontology is associated with each device shown in FIG. 18. For example, the device 960 has type information being the "ball valve", and accordingly, pieces of association information being the "valve object" and the "ball valve" are associated with the device 960. That is, association information meaning the valve is associated with the device 960. Also, association information showing that a device associated with the association information being the "pump" may be connected may also be associated with the device 960.

Such an association between the information of the types of the devices included in the first model and in the second model and the association information may be registered in advance in the storage unit 140 by using a table and the like. The storage unit 140 may store these associations as a first table and a second table, for example. The model converting unit 152 associates each device with the association information based on such registered information, and also models the connections between the respective devices as pieces of graphic information as shown in FIG. 17 and FIG. 18.

Then, the matching processing unit 154 performs the matching processing based on the association information. For example, the matching processing unit 154 determines that the device 860 and the device 960 are the corresponding devices based on the pieces of association information that are the "valve object" and the "ball valve" respectively included in the device 860 and the device 960. Because the matching processing unit 154 utilizes such association information based on the ontology, the matching processing unit 154 can match the devices even if the devices have different names from each other.

Also, the matching processing unit 154 may also perform the matching processing based on the association information about the connection. For example, the device 850 with which the association information being the "pump" is associated is connected to the device 860. According to this, the matching processing unit 154 may determine that a connection destination of the device 960 corresponding to the device 860 may be a device with which the association information being the "pump" is associated. Also, a device 952 and a device 954 that are associated with the association information being the "pump" are connected in parallel, and according to this, the matching processing unit 154 may determine that the device 850, and the device 952 and the device 954 are the corresponding devices.

In this way, the dynamic model generating apparatus 100 according to the present embodiment can also determine a device-to-device correspondence relation between the devices having different names and different connections from each other by using a technology, such as the ontology, in the computer science, the information science and the like. That is, the dynamic model generating apparatus 100 can more accurately perform the matching processing by using a technology that is established systematically. Also, along with a development of such a technology, the accuracy and the efficiency of the dynamic model generating apparatus 100 can also be improved.

Although the above has described that the dynamic model generating apparatus 100 according to the present embodiment shows the matching result by the matching processing unit 154 to the user, and the user inputs an evaluation relative to the matching result and an indication and the like for a further matching, the dynamic model generating apparatus 100 is not limited to this. For example, the matching processing unit 154 outputs, via the interface unit 130, matching candidates of the devices included in the first static model 21 and the devices included in the first piping and instrumentation diagram data 31. In response to an approval of the matching candidates, the matching processing unit 154 may match the devices to each other that have been set as the matching candidates.

Accordingly, the dynamic model generating apparatus 100 can preferentially match the devices that are designated by the user. Also, because the dynamic model generating apparatus 100 can perform the matching based on an order of priority made by the user, generation of the first dynamic model 41 that is to be simulated can be efficiently generated.

Also, the matching processing unit 154 may also first perform the matching processing and then show the matching candidates to the user. In this case, the matching processing unit 154 may show, to the user, a number, a percentage and the like of the devices that can be matched according to the matching result of the matching candidates. Also, the matching processing unit 154 may respectively perform the matching processing on a plurality of matching candidates and show, to the user along with the plurality of matching candidates, the number, the percentage and the like of the devices that can be matched corresponding to each of the plurality of matching candidates.

Also, the matching processing unit 154 may also determine a priority of the matching candidates from the number, the percentage and the like of the devices that can be matched to set a display order of the matching candidates, display highlighting and the like. Also, the matching processing unit 154 may also output only the matching candidates having a priority that is equal to or greater than a reference. Also, the matching processing unit 154 may also show a progress of the matching processing to the user. In this case, the matching processing unit 154 may also further include a progress information output unit to output progress information indicating the progress of the matching of each device in the first static model 21 and each device in the first piping and instrumentation diagram data 31.

Although the above has described the dynamic model generating apparatus 100 according to the present embodiment generates and outputs the first dynamic model 41, the dynamic model generating apparatus 100 is not limited to this. The dynamic model generating apparatus 100 may also output the matching result from the matching unit 150. Also, the dynamic model generating apparatus 100 may also accumulate the matching result by the matching unit 150 in the storage unit 140 or an external database and the like.

Accordingly, because the dynamic model generating apparatus 100 can accumulate an appropriate matching result, the dynamic model generating apparatus 100 can utilize the matching result for a next plant design, improvement and modification. For example, the dynamic model generating apparatus 100 can grasp changed portions and the like by comparing the static model having been used for the previous design with the static model used for the present design. Accordingly, the dynamic model generating apparatus 100 can perform, by utilizing the previous matching result, the matching processing on the changed portions only for the devices that are not changed in the present design.

Also, among the matching result of the respective devices, the devices that are input by the user as the devices to be matched may be stored in the database. Also, in the next matching and thereafter, if a corresponding combination exists in the first model and the second model, the matching processing unit 154 may add the combination as the matching result. Accordingly, an appropriate matching that cannot be automatically picked up by certain algorithm can be added to the matching result without the indication of the user.

Also, among the matching result of the respective devices, the devices that are inappropriately matched by the user may be stored in the database. Then, if a combination corresponding to the next matching result and thereafter exists in the matching result, the matching processing unit 154 may also remove the combination from the matching result. Accordingly, the inappropriately matching result that is automatically picked up by certain algorithm can be removed without the indication of the user.

As described above, the dynamic model generating apparatus 100 can improve the working efficiency of generation of the first dynamic model 41 by outputting the matching result only. Note that if the matching accuracy is improved by accumulating the matching result and the like, the dynamic model generating apparatus 100 may also omit the operation of the user input shown as S360 in FIG. 12. As described above, the dynamic model generating apparatus 100 can reduce labor of manual input of the user during the process of generating the first dynamic model 41, can also reduce occurrence frequency of operation mistakes, and can improve the efficiency of the plant design and creation of the operation training system.

Figure 19:
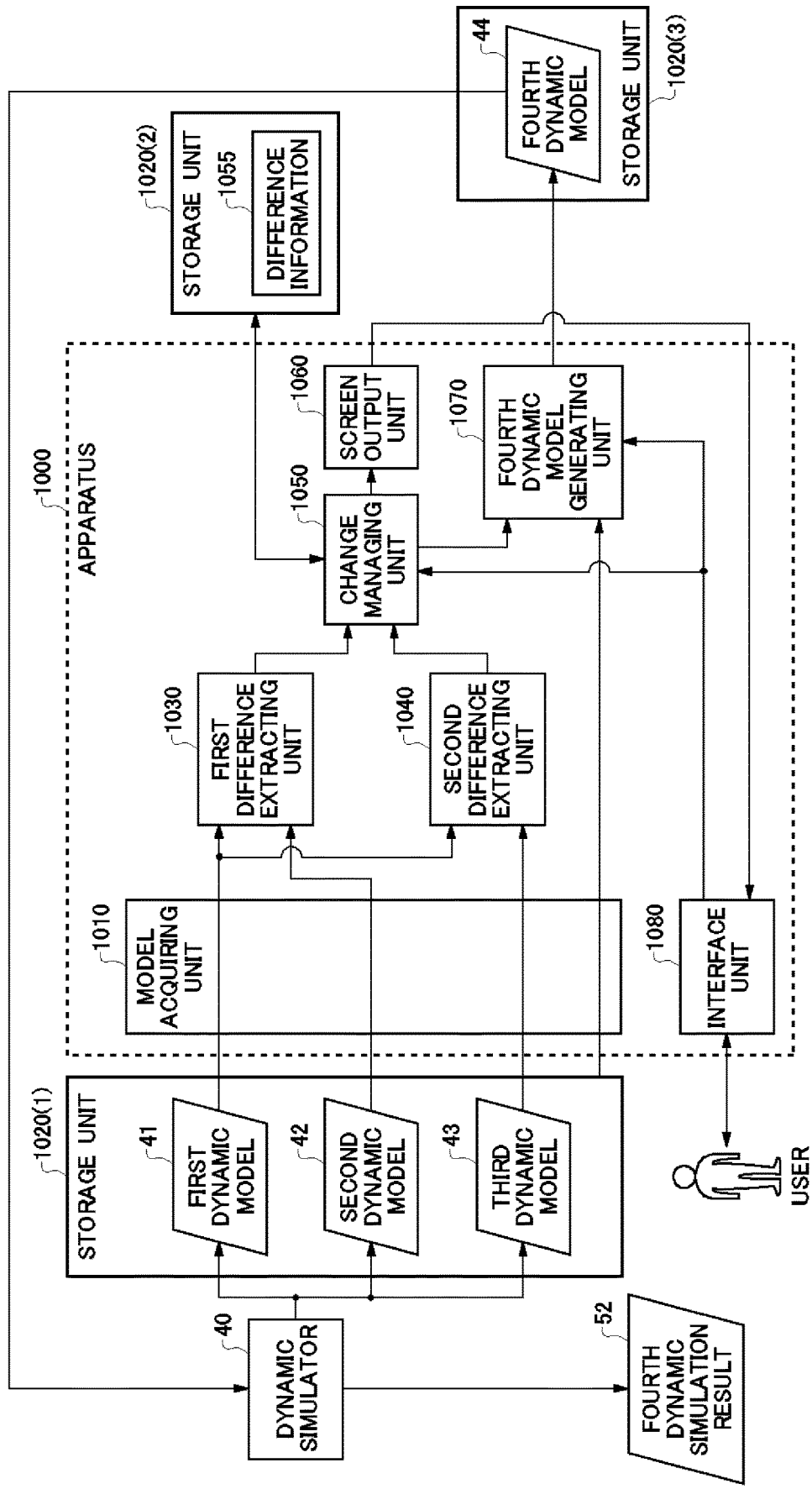
FIG. 19 shows the apparatus 1000 according to a modified example together with three storage units 1020 (1) to 1020 (3).

FIG. 19 shows the apparatus 1000 according to a modified example along with three storage units 1020 (1) to 1020 (3). The storage units 1020 (1) to 1020 (3) may store data for a long period of time as auxiliary storage apparatuses, and may be connected to the apparatus 1000 via a network (as one example, a local area network (LAN) and a wide area network (WAN) such as Internet).

The storage unit 1020 (1) stores the first dynamic model 41, the second dynamic model 42 and the third dynamic model 43. Each time when the dynamic simulator 40 generates a dynamic model, the storage unit 1020 (1) may store the generated dynamic model. Note that each time when a dynamic model is stored in the storage unit 1020 (1), the model acquiring unit 1010 of the apparatus 1000 according to the present modified example may acquire the dynamic model from the storage unit 1020 (1).

Alternatively, the model acquiring unit 1010 may also acquire, from the storage unit 1020 (1), any dynamic model that is designated by the user among a plurality of dynamic models stored in the storage unit 1020 (1). Also, the fourth dynamic model generating unit 1070 of the apparatus 1000 according to the present modified example may acquire a dynamic model, that is obtained by incorporating the difference information, among the first dynamic model 41, the second dynamic model 42 and the third dynamic model 43 from the storage unit 1020 (1).

The storage unit 1020 (2) stores difference information 1055. The difference information 1055 includes the information of the first difference and the information of the second difference. Note that each time when difference information is extracted by the first difference extracting unit 1030 and the second difference extracting unit 1040, the change managing unit 1050 of the apparatus 1000 according to the present modified example may store the difference information in the storage unit 1020 (2). The change managing unit 1050 may read the information of the difference in accordance with the indication and the like of the user from the storage unit 1020 (2).

The storage unit 1020 (3) stores the fourth dynamic model 44. The storage unit 1020 (3) may store the fourth dynamic model 44 in accordance with the generation of the fourth dynamic model 44 by the fourth dynamic model generating unit 1070. Note that each time when the fourth dynamic model 44 is stored in the storage unit 1020 (3), the dynamic simulator 40 according to the present modified example may perform a dynamic simulation by using the fourth dynamic model 44. Alternatively, the dynamic simulator 40 may also perform the dynamic simulation by using any fourth dynamic model 44, which is designated by the user, of a plurality of fourth dynamic models 44 stored in the storage unit 1020 (3).

Note that although in the present modified example it is described that the three storage units 1020 (1) to 1020 (3) are provided outside the apparatus 1000, at least one of the storage units 1020 (1) to 1020 (3) may also be provided inside the apparatus 1000, or at least two of the storage units 1020 (1) to 1020 (3) may also be integrated and be provided as one storage unit.

Also, in the above-described embodiment and modified example it is described that the first difference extracting unit 1030 extracts the first difference between the first dynamic model 41 and the second dynamic model 42, and the second difference extracting unit 1040 extracts the second difference between the first dynamic model 41 and the third dynamic model 43. However, the first difference extracting unit 1030 and the second difference extracting unit 1040 may extract a difference between two arbitrary dynamic models of the first dynamic model 41, the second dynamic model 42 and the third dynamic model 43.

Figure 20:
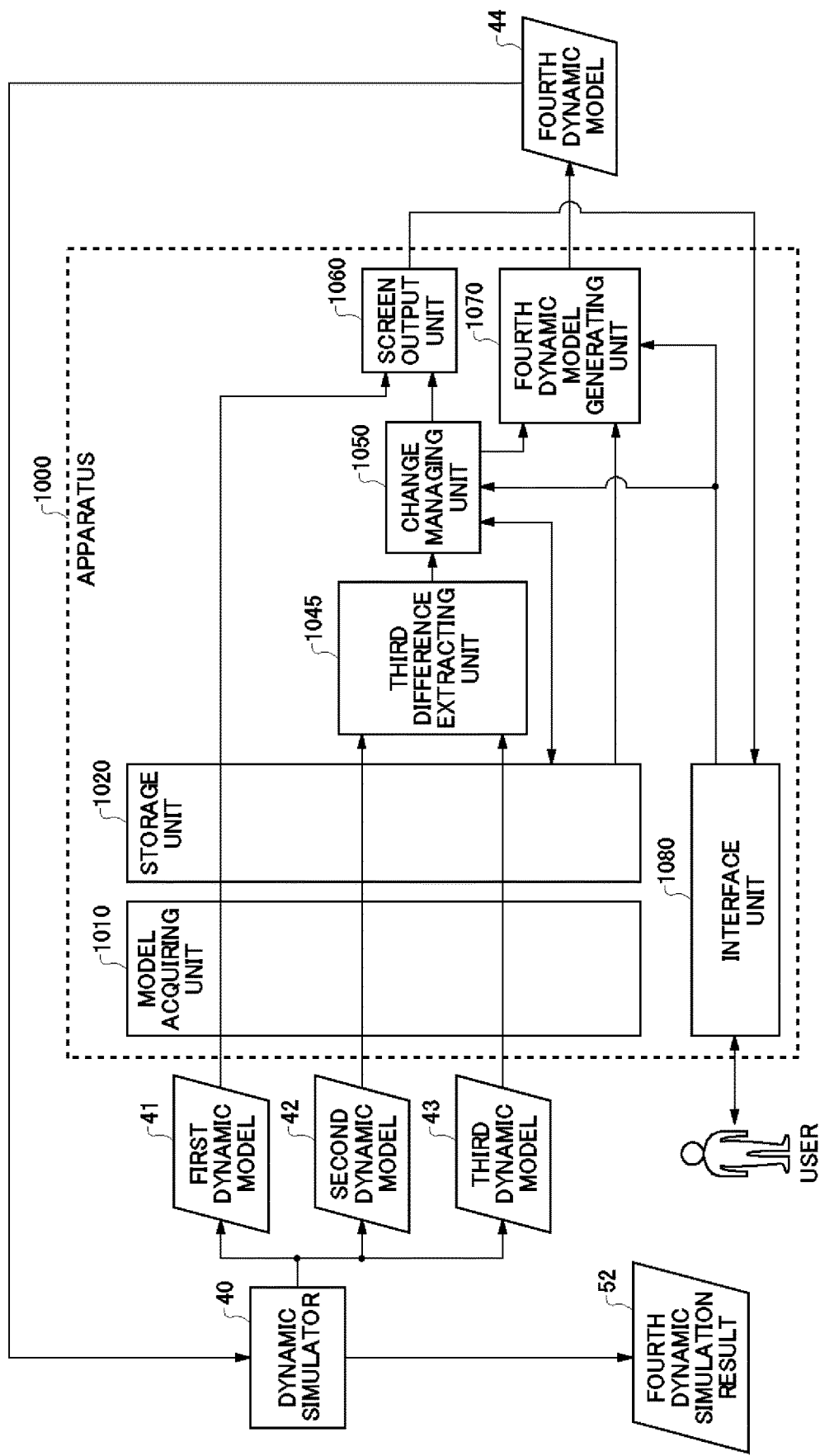
FIG. 20 shows a modified example of the apparatus 1000.

Also, although it is described that the apparatus 1000 includes the first difference extracting unit 1030 configured to extract the first difference and the second difference extracting unit 1040 configured to extract the second difference, the apparatus 1000 may also include other difference extracting units instead of these. FIG. 20 shows a modified example of the apparatus 1000. The apparatus 1000 includes a third difference extracting unit 1045 configured to extract at least one third difference that is at least one difference between the second dynamic model 42 and the third dynamic model 43. The third difference extracting unit 1045 may extract differences of information of devices, parameters, connections and the like respectively included in the second dynamic model 42 and the third dynamic model 43.

In the present modified example, the change managing unit 1050 manages information of the third difference. For example, to output the information of the third difference, the change managing unit 1050 supplies the information to the screen output unit 1060 and stores the information in the storage unit 1020. Also, in a case in which the apparatus 1000 generates the fourth dynamic model 44, the change managing unit 1050 supplies the information of the third difference to the fourth dynamic model generating unit 1070, The change managing unit 1050 may supply the information of the third difference to each unit according to the indication and the like of the user. The change managing unit 1050 may read the information of the difference in accordance with the indication and the like of the user from the storage unit 1020.

The screen output unit 1060 outputs a display screen including a first dynamic model 41 and the third difference. The screen output unit 1060 outputs the display screen to the interface unit 1080, for example. The screen output unit 1060 may display the configuration, the components, the connection state and the like of the first dynamic model 41. Here, the third difference is a difference between the second dynamic model 42 and the third dynamic model 43. Therefore, the third difference may be an exclusive OR of the contents changed when generating the second dynamic model 42 by adjusting the first dynamic model 41 and the contents changed when changing the first plant to the second plant. The screen output unit 1060 may display the third difference as a change added to the third dynamic model 43 in a case in which the second dynamic model 42 is set as a reference (a comparison source model). As one example, the screen output unit 1060 may recognizably display each third difference being either an addition or a deletion to or from the second dynamic model 42.

The fourth dynamic model generating unit 1070 generates, based on the information of the third difference, the fourth dynamic model 44 with the second dynamic model 42 as the base. For example, the fourth dynamic model generating unit 1070 generates the fourth dynamic model 44 by incorporating or without incorporating the difference information selected and designated by the user among the information of the third difference into the second dynamic model 42. The fourth dynamic model generating unit 1070 may acquire, from the storage unit 1020, the second dynamic model 42 into which the difference information is incorporated.

According to the above-described modified example, the user can generate the fourth dynamic model 44 with the second dynamic model 42 as the base with reference to the first model if necessary while checking the third difference. Note that the apparatus 1000 according to the present modified example may also further include at least one of the first difference extracting unit 1030 and the second difference extracting unit 1040. In this case, the user can generate the fourth dynamic model 44 while referencing information of at least one of the first difference and the second difference in addition to the third difference.

Figure 21:
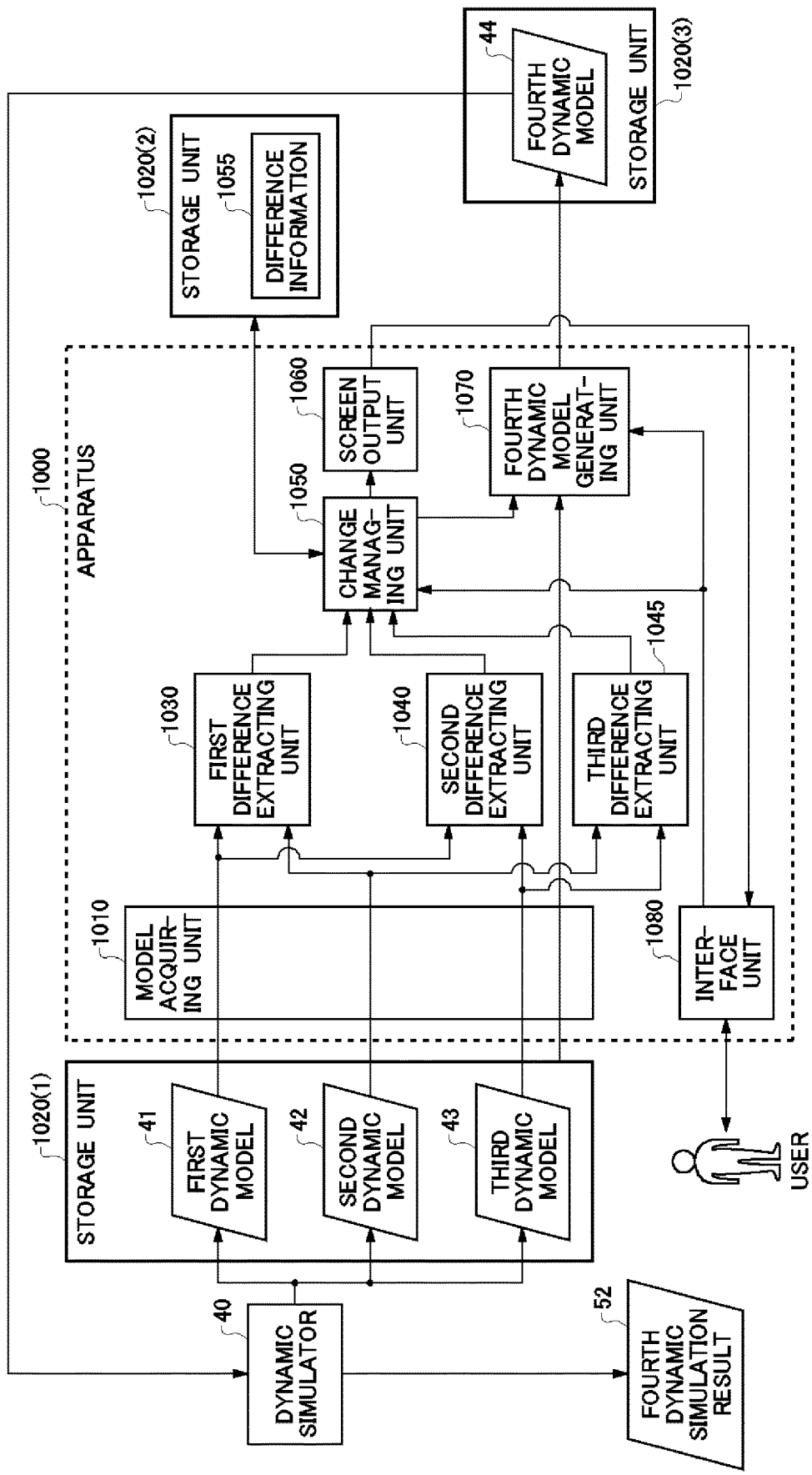
FIG. 21 shows another modified example of the apparatus 1000.

Note that although in the present modified example it is described that the apparatus 1000 includes the third difference extracting unit 1045 instead of the first difference extracting unit 1030 and the second difference extracting unit 1040, the apparatus 1000 may include the third difference extracting unit 1045 in addition to the first difference extracting unit 1030 and the second difference extracting unit 1040. FIG. 21 shows another modified example of the apparatus 1000. In this case, the screen output unit 1060 may output the display screen including any one of the first dynamic model 41 to third dynamic model 43 and the first difference to the third difference. The fourth dynamic model generating unit 1070 may generate the fourth dynamic model 44 by incorporating the difference information selected and designated by the user among the first difference to the third difference into the dynamic model selected and designated by the user among the first dynamic model 41 to the third dynamic model 43.

Also, although in the above-described embodiment and modified example it is described that the fourth dynamic model generating unit 1070 generates the fourth dynamic model 44 by incorporating the difference designated by the user and the like among difference groups including the at least one first difference and the at least one second difference, the fourth dynamic model generating unit 1070 may also generate the fourth dynamic model 44 by automatically performing the designation of the difference. The fourth dynamic model generating unit 1070 may automatically perform the designation within a current difference group based on a tendency of the difference designation in the past.

For example, first, the fourth dynamic model generating unit 1070 may read, from the storage unit 1020, a plurality of parameters included in the first dynamic model 41 to the third dynamic model 43 within a set for each set of the first dynamic model 41 to the third dynamic model 43. The plurality of read parameters may include at least one of a parameter of a device related to the difference and parameters of one or more other devices connected to the device. Next, the fourth dynamic model generating unit 1070 may detect, from the storage unit 1020, the fourth dynamic model 44 generated from the first dynamic model 41 to the third dynamic model 43 of a set having the highest parameter matching degree with respect to the current dynamic model 41 to third dynamic model 43. Then, the fourth dynamic model generating unit 1070 may designate the difference within the current difference group so as to match the contents of the fourth dynamic model 44.

In this case, the fourth dynamic model generating unit 1070 may also determine whether to designate the difference or not for each difference included in the difference group. For example, the fourth dynamic model generating unit 1070 may sequentially set each difference included in the current difference group as a target difference, and detect, in the storage unit 1020, a plurality of sets in which a difference having the same contents as that of the target difference is extracted as at least one of the first difference and the second difference. The fourth dynamic model generating unit 1070 may read, for each detected set from the storage unit 1020, at least one of a parameter of a device related to the target difference and parameters of one or more other devices connected to the device. The fourth dynamic model generating unit 1070 may calculate parameter matching degrees between the read parameter and the parameters of the current first dynamic model 41 to third dynamic model 43. The fourth dynamic model generating unit 1070 may detect, from the storage unit 1020, the fourth dynamic model 44 generated from a set having the highest parameter matching degree, and determine whether to designate the target difference within the current difference group or not so as to match the contents of the fourth dynamic model 44.

Alternatively, the apparatus 1000 may also generate the fourth dynamic model 44 by semi-automatically performing the designation of the difference. For example, the fourth dynamic model generating unit 1070 may detect, in the storage unit 1020, a plurality of sets in which the difference having the same contents as that of the target difference is extracted as at least one of the first difference and the second difference. The fourth dynamic model generating unit 1070 may read, for each detected set from the storage unit 1020, at least one of a parameter of a device related to the target difference and parameters of one or more other devices connected to the device to calculate the parameter matching degrees with the parameters of the current first dynamic model 41 to third dynamic model 43. The fourth dynamic model generating unit 1070 may detect, from the storage unit 1020, a plurality of fourth dynamic models 44 generated from a plurality of detected sets, make contents of each fourth dynamic model 44 correspond to a parameter matching degree of a corresponding set and display the contents of each fourth dynamic model 44 on the interface unit 1080. The fourth dynamic model generating unit 1070 may also sort and display the fourth dynamic models 44 in a descending order of the parameter matching degrees. Then, the fourth dynamic model generating unit 1070 may determine whether to designate the target difference in the current difference group or not so as to match the contents of the fourth dynamic model 44 designated by the user.

Also, the first dynamic model 41 is described as a model calculating a dynamic state of a first plant, the second dynamic model 42 is described as a model calculating a dynamic state of the first plant obtained by adjusting the model calculating the dynamic state (here, the first dynamic model 41) of the first plant and the third dynamic model 43 is described as a model calculating a dynamic state of a second plant. However, the contents of two or three of the first dynamic model 41 to the third dynamic model 43 may also be swapped with each other. For example, the contents of the first dynamic model 41 may also be reverse to the contents of the second dynamic model 42. That is, the second dynamic model 42 may be a model calculating a dynamic state of the first plant, and the first dynamic model 41 may also be a model calculating a dynamic state of the first plant obtained by adjusting the model calculating the dynamic state (here, the second dynamic model 42) of the first plant. In this case, the second difference is a difference between the first dynamic model 41 (the model calculating the dynamic state of the first plant obtained by adjusting the model calculating the dynamic state of the first plant) and the third dynamic model 43 (the model calculating the dynamic state of the second plant).

Also, various embodiments of the present invention may be described with reference to flow charts and block diagrams. Here, the block diagrams may represent: (1) steps of processes of performing operations or (2) sections of an apparatus serving to perform operations. Specific steps and sections may be implanted by at least one of a dedicated circuit, a programmable circuit supplied along with a computer-readable instruction stored on a computer-readable medium, and a processor supplied along with a computer-readable instruction stored on a computer-readable medium. The dedicated circuit may include at least one of a digital hardware circuit and an analog hardware circuit, and may include at least one of an integrated circuit (IC) and a discrete circuit. The programmable circuit may include a reconfigurable hardware circuit that includes a memory element and the like such as a logical AND, logical OR, logical XOR, logical NAND, logical NOR and another logical operation, a flip-flop, a register, a field programmable gate array (FPGA) and a programmable logic array (PLA).

The computer-readable medium may include any tangible device that can store an instruction executed by an appropriate device. As a result, the computer-readable medium having the instruction stored thereon includes a product including an instruction that can be executed to make a means for performing an operation specified in flow charts or block diagrams. As an example of the computer-readable medium, an electronic storage medium, a magnetic storage medium, an optical storage medium, an electromagnetic storage medium, a semiconductor storage medium and the like may be included. As a more specific example of the computer-readable medium, a floppy (registered trademark) disk, a diskette, a hard disk, a random access memory (RAM), a read-only memory (ROM), an erasable programmable read-only memory (EPROM or flash memory), electrically erasable programmable read-only memory (EEPROM), a static random access memory (SRAM), a compact discrete read-only memory (CD-ROM), a digital versatile disk (DVD), a Blu-Ray (registered trademark) (RTM) disk, a memory stick, an integrated circuit card and the like may be included.

The computer-readable instruction may include any of an assembler instruction, an instruction set architecture (ISA) instruction, a machine instruction, a machine-dependent instruction, a microcode, a firmware instruction, state setting data, or a code or an object code described by an arbitrary combination of one or more programming languages including an object oriented programming language such as Smalltalk, JAVA (registered trademark) and C++, and a conventional procedural programming language such as "C" programming language or a similar programming language.

The computer-readable instruction may be provided, for a processor or a programmable circuit of a general purpose computer, a specific purpose computer or another programmable data processing apparatus, locally or via a local area network (LAN) and a wide area network (WAN) such as Internet. To make a means for performing an operation specified in a flow chart or a block diagram, the computer-readable instruction may be performed. As an example of the processor, a computer processor, a processing unit, a microprocessor, a digital signal processor, a controller, a microcontroller and the like are included.

Figure 22:
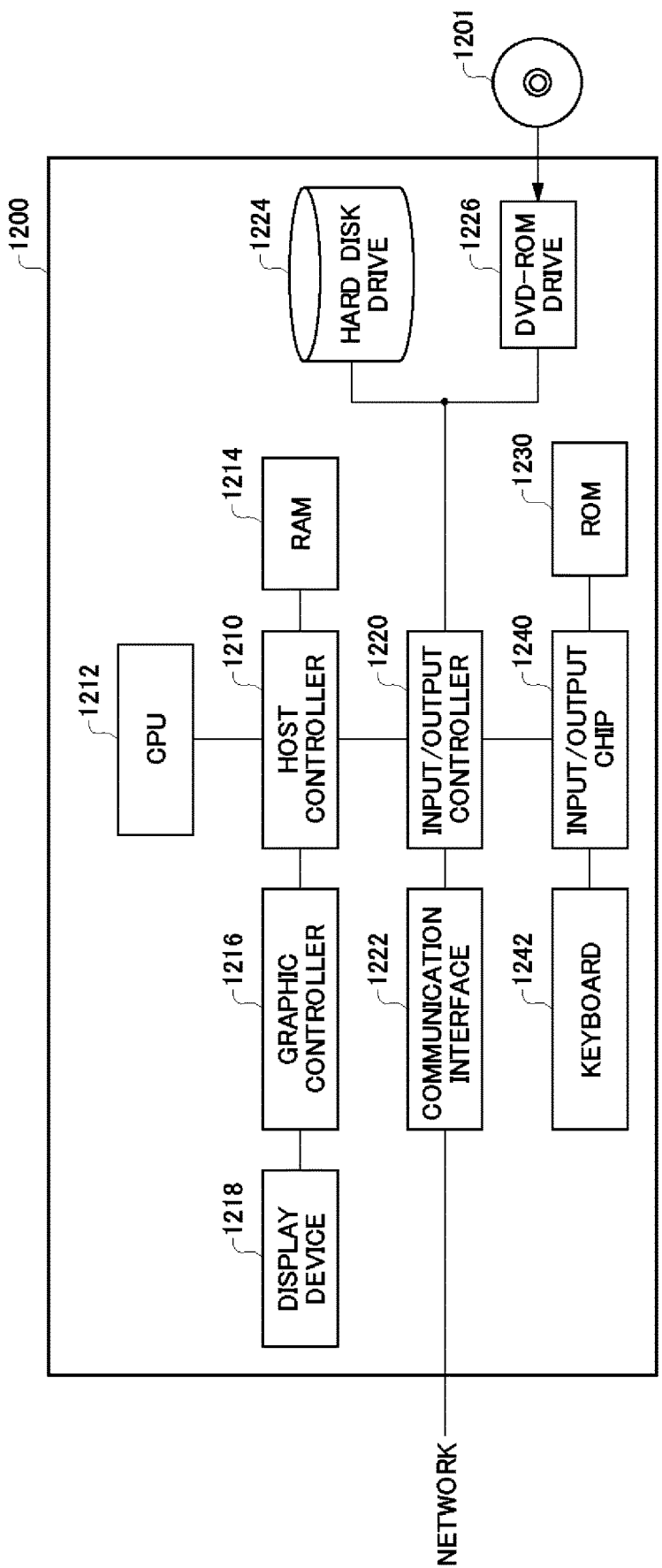
FIG. 22 shows a configuration example of a computer 1200 in which a plurality of aspects of the present invention may be entirely or partially embodied.

FIG. 22 shows a configuration example of a computer 1200 in which the plurality of aspects of the present invention may be entirely or partially embodied. A program installed in the computer 1200 can make the computer 1200 serve as an operation associated with an apparatus according to an embodiment of the present invention or one or more "units" of the apparatus or execute the operation or the one or more "units", and/or can make the computer 1200 execute a process according to an embodiment of the present invention or steps of the process. Such a program may be executed by a CPU 1212 to make the computer 1200 perform a specific operation associated with some or all of blocks of the flowcharts and the block diagrams described in the present specification. Also, a process according to an embodiment of the present invention or steps of the process may also be performed in a cloud environment.

The computer 1200 according to the present embodiment includes the CPU 1212, an RAM 1214, a graphic controller 1216 and a display device 1218, which are mutually connected via a host controller 1210. The computer 1200 also includes a communication interface 1222, a hard disk drive 1224, a DVD-ROM drive 1226 and an input/output unit such as an IC card drive, which are connected to the host controller 1210 via an input/output controller 1220. The computer also includes legacy input/output units such as an ROM 1230 and a keyboard 1242, which are connected to the input/output controller 1220 via the input/output chip 1240.

The CPU 1212 operates according to a program stored in the ROM 1230 and the RAM 1214 to control each unit accordingly. The graphic controller 1216 acquires image data, that is generated by the CPU 1212, in a frame buffer and the like provided in the RAM 1214, or in the graphic controller 1216 itself, and display the image data on the display device 1218.

The communication interface 1222 communicates with another electronic device via a network. The hard disk drive 1224 stores a program and data used by the CPU 1212 in the computer 1200. The DVD-ROM drive 1226 reads the program or the data from the DVD-ROM 1201 and provides the program or the data to the hard disk drive 1224 via the RAM 1214. The IC card drive reads the program and the data from an IC card and/or writes the program and the data in the IC card.

The ROM 1230 stores thereon a boot program and the like executed by the computer 1200 at the time of an activation, and/or a program depending on hardware of the computer 1200. The input/output chip 1240 may also connect various input/output units to the input/output controller 1220 via a parallel port, a serial port, a keyboard port, a mouse port and the like.

The programs are provided by a computer-readable storage medium such as the DVD-ROM 1201 or an IC card. The programs are read from the computer-readable storage medium, and are installed in the hard disk drive 1224, the RAM 1214 or the ROM 1230, that are also examples of the computer-readable storage medium, and executed by the CPU 1212. Information processing described in these programs is read by the computer 1200 and results in cooperation between the programs and pieces of hardware of various types described above. The apparatus or method may be configured by realizing an operation or processing of the information through the use of the computer 1200.

For example, if communication is performed between the computer 1200 and an external device, the CPU 1212 may execute a communication program loaded on the RAM 1214 and instruct the communication interface 1222 for a communication processing based on the processing described in the communication program. The communication interface 1222 reads transmission data stored in a transmission buffer region provided in a recording medium such as the RAM 1214, the hard disk drive 1224, the DVD-ROM 1201 or the IC card under a control of the CPU 1212 and transmits the read transmission data to a network or writes reception data received from the network in a reception buffer region and the like provided on the recording medium.

Also, the CPU 1212 may perform various types of processing on the data on the RAM 1214 so that all or necessary parts of files or database stored in an external recording medium such as the hard disk drive 1224, the DVD-ROM drive 1226 (DVD-ROM 1201), the IC card and the like are read by the RAM 1214. Next, the CPU 1212 may write back the processed data in the external recording medium.

Various types of information such as various types of programs, data, tables and database may be stored in a recording medium to be information-processed. The CPU 1212 may execute, on the read data from the RAM 1214, various types of processing including various types of operations, information processing, condition determination, conditional branch, unconditional branch, information search/replacement and the like that are described throughout the present disclosure and are designated by an instruction sequence of a program, and write back the result to the RAM 1214. Also, the CPU 1212 may search for the files in the recording medium and the information in the database and the like. For example, if a plurality of entries each having an attribute value of a first attribute associated with an attribute value of a second attribute are stored in a recording medium, the CPU 1212 may search, from the plurality of entries, for an entry in which the attribute value of the first attribute matches a designated condition, and read an attribute value of a second attribute stored in the entry, and accordingly acquire the attribute value of the second attribute associated with the first attribute that satisfies a predetermined condition.

The programs or software module according to the above description may be stored in a computer-readable storage medium on the computer 1200 or near the computer 1200. Also, a recording medium such as a hard disk or an RAM provided in a server system connected to a dedicated communication network or Internet is usable as a computer-readable storage medium so as to provide the programs to the computer 1200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

REFERENCE SIGNS LIST

10 . . . generating apparatus; 20 . . . static simulator; 21 . . . first static model; 22 . . . second static model; 30 . . . plant engineering software; 31 . . . first piping and instrumentation diagram data; 32 . . . second piping and instrumentation diagram data; 40 . . . dynamic simulator; 41 . . . first dynamic model; 42 . . . second dynamic model; 43 . . . third dynamic model; 44 . . . fourth dynamic model; 51 . . . second dynamic simulation result; 52 . . . fourth dynamic simulation result; 100 . . . dynamic model generating apparatus; 110 . . . static model acquiring unit; 120 . . . piping and instrumentation diagram data acquiring unit; 130 . . . interface unit; 140 . . . storage unit; 150 . . . matching unit; 152 . . . model converting unit; 154 . . . matching processing unit; 160 . . . dynamic model generating unit; 162 . . . integrated model generating unit; 164 . . . converting unit; 602 . . . input unit; 604 . . . output unit; 610 . . . heat exchanger; 620 . . . reactor; 630 . . . tank; 640 . . . compressor; 650 . . . pump; 660 . . . valve; 702 . . . input unit; 704 . . . output unit; 706 . . . valve;

708 . . . valve; 712 . . . first heat exchanger; 714 . . . second heat exchanger; 720 . . . reactor; 730 . . . tank; 740 . . . compressor; 752 . . . first pump; 754 . . . second pump; 760 . . . valve; 802 . . . input unit; 804 . . . output unit; 810 . . . device; 820 . . . device; 830 . . . device; 840 . . . device; 850 . . . device; 860 . . . device; 902 . . . input unit; 904 . . . output unit; 952 . . . device; 954 . . . device; 960 . . . device; 1000 . . . apparatus; 1010 . . . model acquiring unit; 1020 . . . storage unit; 1030 . . . first difference extracting unit; 1040 . . . second difference extracting unit; 1050 . . . change managing unit; 1060 . . . screen output unit; 1070 . . . fourth dynamic model generating unit; 1080 . . . interface unit; 1082 . . . first portion; 1084 . . . second portion; 1086 . . . third portion; 1088 . . . first icon; 1090 . . . second icon; 1092 . . . third icon; 1094 . . . deletion; 1096 . . . addition; 1200 . . . computer; 1201 . . . DVD-ROM; 1210 . . . host controller; 1212 . . . CPU; 1214 . . . RAM; 1216 . . . graphic controller; 1218 . . . display device; 1220 . . . input/output controller; 1222 . . . communication interface; 1224 . . . hard disk drive; 1226 . . . DVD-ROM drive; 1230 . . . ROM; 1240 . . . input/output chip; 1242 . . . keyboard

What is claimed is:

1. An apparatus comprising:
   a model acquiring unit configured to acquire a first dynamic model, a second dynamic model and a third dynamic model;
   a first difference extracting unit configured to extract at least one first difference being at least one difference between the first dynamic model and the second dynamic model that are acquired by the model acquiring unit;
   a second difference extracting unit configured to extract at least one second difference being at least one difference between the first dynamic model and the third dynamic model that are acquired by the model acquiring unit;
   a dynamic plant simulator configured to provide a dynamic simulation result of a plant based on said at least one first difference and said at least one second difference; and
   a screen output unit configured to graphically display one or more of the at least one first difference and the at least one second difference to facilitate managing operational and design changes over time;
   wherein
   the first dynamic model is generated based on a static model indicating a steady state of a first plant,
   the first dynamic model is a model calculating a dynamic state of the first plant,
   the second dynamic model is a model calculating the dynamic state of the first plant which reflects an adjustment of the first dynamic model,
   the third dynamic model is a model calculating a dynamic state of a second plant which represents a change of the first plant,
   the first dynamic model and the second dynamic model include a differential equation for calculating the dynamic state of the first plant, and
   the third dynamic model includes a differential equation for calculating the dynamic state of the second plant.

2. The apparatus according to claim 1, further comprising a dynamic model generating unit configured to incorporate any of the at least one first difference and the at least one second difference into at least one of the first dynamic model, the second dynamic model and the third dynamic model so as to generate a fourth dynamic model.

3. The apparatus according to claim 1, further comprising a change managing unit configured to manage information of the at least one first difference and the at least one second difference.

4. The apparatus according to claim 1, further comprising a dynamic model generating apparatus configured to generate the first dynamic model based on the static model indicating the steady state of the first plant.

5. The apparatus according to claim 4, wherein
   the dynamic model generating apparatus is configured to generate the first dynamic model further based on first piping and instrumentation diagram data of the first plant.

6. The apparatus according to claim 5, wherein
   the dynamic model generating apparatus is configured to generate the third dynamic model based on a static model indicating a steady state of the second plant which represents a change of the first plant.

7. The apparatus according to claim 6, wherein
   the dynamic model generating apparatus is configured to generate the third dynamic model further based on second piping and instrumentation diagram data which represents a change of the first piping and instrumentation diagram data of the first plant for the second plant which represents a change of the first plant.

8. The apparatus according to claim 1, wherein
   the screen output unit is configured to output the display screen having a table that includes:
   a first column in which the at least one first difference and the at least one second difference are displayed such that the at least one first difference and the at least one second difference are arranged next to each other in the same column;
   a second column in which the at least one first difference is displayed in a same row as a row of the first column in which the at least one first difference is displayed; and
   a third column in which the at least one second difference is displayed in a same row as a row of the first column in which the at least one second difference is displayed.

9. The apparatus according to claim 1, wherein the screen output unit is configured to output the display screen that further displays each of the first difference and the second difference being either an addition or a deletion to or from the first dynamic model.

10. The apparatus according to claim 9, wherein the screen output unit is configured to be able to interchange display forms between the addition and the deletion.

11. The apparatus according to claim 1, further comprising:
    a third difference extracting unit configured to extract at least one third difference that is at least one difference between the second dynamic model and the third dynamic model; and
    a dynamic model generating unit configured to incorporate any of the at least one third difference into the second dynamic model so as to generate a fourth dynamic, wherein
    the second dynamic model is a model calculating a dynamic state of the first plant which reflects an adjustment of the first dynamic model, and
    the third dynamic model is a model calculating a dynamic state of second plant which represents a change of the first plant.

12. The apparatus according to claim 1, further comprising:
a dynamic model generating apparatus configured to generate the first dynamic model based on a static model indicating a steady state of the first plant and first piping and instrumentation diagram data of the first plant that have no compatibility with the static model,
wherein the dynamic model generating apparatus includes:
a model converting unit configured to convert the static model into a first model based on the first static model, and convert the first piping and instrumentation diagram data into a second model based on the first piping and instrumentation diagram data, the first model and the second model having a common representation format;
a matching processing unit configured to match devices included in the first model with devices in the second model; and
a dynamic model generating unit configured to generate the first dynamic model based on the matching result by the matching processing unit.

13. The apparatus according to claim 1, wherein the first difference extracting unit extracts a difference of pieces of information of devices, parameters and connections respectively included in the first dynamic model and the second dynamic model.

14. A method comprising:
acquiring a first dynamic model, a second dynamic model and a third dynamic model;
extracting at least one first difference being at least one difference between the first dynamic model and the second dynamic model that are acquired by the acquiring;
extracting at least one second difference being at least one difference between the first dynamic model and the third dynamic model that are acquired by the acquiring;
providing a dynamic simulation result of a plant based on said at least one first difference and said at least one second difference; and
displaying one or more of the at least one first difference and the at least one second difference to facilitate managing operational and design changes over time;
wherein
the first dynamic model is generated based on a static model indicating a steady state of a first plant,
the first dynamic model is a model calculating a dynamic state of the first plant,
the second dynamic model is a model calculating the dynamic state of the first plant which reflects an adjustment of the first dynamic model,
the third dynamic model is a model calculating a dynamic state of a second plant which represents a change of the first plant,
the first dynamic model and the second dynamic model include a differential equation for calculating the dynamic state of the first plant, and
the third dynamic model includes a differential equation for calculating the dynamic state of the second plant.

15. A non-transitory computer readable medium storing thereon a program for causing a computer to function as an apparatus by performing operations, comprising:
acquiring a first dynamic model, a second dynamic model and a third dynamic model;
extracting at least one first difference being at least one difference between the first dynamic model and the second dynamic model that are acquired by the acquiring;
extracting at least one second difference being at least one difference between the first dynamic model and the third dynamic model that are acquired by the acquiring;
providing a dynamic simulation result of a plant based on said at least one first difference and said at least one second difference; and
displaying one or more of the at least one first difference and the at least one second difference to facilitate managing operational and design changes over time;
wherein
the first dynamic model is generated based on a static model indicating a steady state of a first plant,
the first dynamic model is a model calculating a dynamic state of the first plant,
the second dynamic model is a model calculating the dynamic state of the first plant which reflects an adjustment of the first dynamic model,
the third dynamic model is a model calculating a dynamic state of a second plant which represents a change of the first plant,
the first dynamic model and the second dynamic model include a differential equation for calculating the dynamic state of the first plant, and
the third dynamic model includes a differential equation for calculating the dynamic state of the second plant.

* * * * *